(12) United States Patent
Ling et al.

(10) Patent No.: US 9,053,419 B2
(45) Date of Patent: Jun. 9, 2015

(54) METHOD AND SYSTEM FOR RECORDING RECOMMENDED CONTENT USING CLUSTERING

(71) Applicant: The DIRECTV Group, Inc., El Segundo, CA (US)

(72) Inventors: Sui-Ky Ringo Ling, Rancho Palos Verdes, CA (US); Raynold M. Kahn, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 267 days.

(21) Appl. No.: 13/803,121

(22) Filed: Mar. 14, 2013

(65) Prior Publication Data

US 2014/0279781 A1 Sep. 18, 2014

(51) Int. Cl.
| | | |
|---|---|---|
| G06F 17/00 | (2006.01) | |
| G06N 5/02 | (2006.01) | |
| G06Q 50/00 | (2012.01) | |
| H04L 12/18 | (2006.01) | |
| H04N 21/231 | (2011.01) | |
| H04N 21/442 | (2011.01) | |
| H04N 21/6543 | (2011.01) | |
| H04L 29/08 | (2006.01) | |

(52) U.S. Cl.
CPC . *G06N 5/02* (2013.01); *H04L 67/26* (2013.01); *G06Q 50/00* (2013.01); *H04L 12/1859* (2013.01); *H04N 21/23106* (2013.01); *H04N 21/44222* (2013.01); *H04N 21/6543* (2013.01); *H04L 67/2842* (2013.01)

(58) Field of Classification Search
USPC ......................................................... 706/46
See application file for complete search history.

(56) References Cited

U.S. PATENT DOCUMENTS

| 5,790,935 | A | 8/1998 | Payton | |
|---|---|---|---|---|
| 8,364,778 | B2* | 1/2013 | Kahn et al. | 709/217 |
| 8,521,852 | B2* | 8/2013 | Filbrich et al. | 709/220 |
| 8,533,767 | B1* | 9/2013 | Tsang et al. | 725/114 |
| 8,583,922 | B2* | 11/2013 | Kahn | 713/168 |
| 8,671,211 | B2* | 3/2014 | Irvine et al. | 709/231 |
| 8,677,152 | B2* | 3/2014 | Kahn et al. | 713/193 |
| 8,689,271 | B2* | 4/2014 | Cocchi et al. | 725/110 |
| 8,732,780 | B2* | 5/2014 | Kahn et al. | 725/109 |

(Continued)

FOREIGN PATENT DOCUMENTS

| EP | 1511315 A2 | 3/2005 |
|---|---|---|
| EP | 2028850 A2 | 2/2009 |

OTHER PUBLICATIONS

Efficient and adaptive Web replication using content clustering, Yan Chen; Lili Qiu; Weiyu Chen; Luan Nguyen; Katz, R.H. Selected Areas in Communications, IEEE Journal on vol. 21, Issue: 6 DOI: 10.1109/JSAC.2003.814608 Publication Year: 2003, pp. 979-994.*

(Continued)

*Primary Examiner* — Michael B Holmes

(57) ABSTRACT

A method and system for storing push content includes a user device having a memory and a viewer tracking module generating a viewed content history for content corresponding to viewed content at the user device. A recommendation recording module compares the viewed content history and push content and stores at least one push content at the user device in response comparing to form a recorded content push list. A display displays the recorded content push list corresponding to the content stored in the user device.

28 Claims, 20 Drawing Sheets

(56) References Cited

U.S. PATENT DOCUMENTS

| | | | |
|---|---|---|---|
| 8,763,059 B1* | 6/2014 | James et al. | 725/106 |
| 8,775,319 B2* | 7/2014 | Kahn et al. | 705/59 |
| 8,782,438 B2* | 7/2014 | Kahn et al. | 713/193 |
| 8,782,719 B2* | 7/2014 | Arsenault et al. | 725/86 |
| 8,793,748 B2* | 7/2014 | Ling | 725/86 |
| 2003/0050991 A1 | 3/2003 | Towell et al. | |
| 2003/0233656 A1 | 12/2003 | Sie et al. | |
| 2004/0117829 A1 | 6/2004 | Karaoguz et al. | |
| 2006/0037043 A1 | 2/2006 | Kortum et al. | |
| 2009/0158307 A1 | 6/2009 | Kashitani | |
| 2010/0153999 A1 | 6/2010 | Yates | |
| 2010/0251305 A1 | 9/2010 | Kimble et al. | |
| 2011/0135281 A1 | 6/2011 | Meare | |
| 2011/0289522 A1 | 11/2011 | Pontual et al. | |
| 2012/0331494 A1 | 12/2012 | Pontual et al. | |
| 2014/0351835 A1 | 11/2014 | Orlowski | |

OTHER PUBLICATIONS

Clustering Web content for efficient replication, Yan Chen; Lili Qiu; Weiyu Chen; Luan Nguyen; Katz, R.H. Network Protocols, 2002. Proceedings. 10th IEEE International Conference on DOI: 10.1109/ICNP.2002.1181397 Publication Year: 2002, pp. 165-174.*

International Search Report and Written Opinion dated Jul. 3, 2014 in International Application No. PCT/US2014/023780 filed Mar. 11, 2014 by Sui-Ky Ringo Ling et al.

International Search Report and Written Opinion dated Jul. 3, 2014 in International Application No. PCT/US2014/023774 filed Mar. 11, 2014 by Sui-Ky Ringo Ling et al.

Ehrmantraut, Michael; Harder, Theo; Wittig, Hartmut; Steinmetz, Ralf; "The Personal Electronic Program Guide-Towards the Pre-selection of Individual TV Programs"; ACM; 2 Penn Plaza, Suite 701, New York, New York, USA; Dec. 31, 1996; XP040085062; pp. 243-250.

Non-final Office action dated Jan. 6, 2015 in U.S. Appl. No. 13/803,004, filed Mar. 14, 2013 by Sui-Ky Ringo Ling et al.

* cited by examiner

| Genre | Comedy | | Westerns Ids: 42, 88 |
|---|---|---|---|
| Subgenre | Screwball Comedy Id: 12 | Comedy Drama | |
| Movie Type | | Romantic Comedy Ids: 3, 41 | Teen Angst Comedy Id: 44 | |

650

| Genre | Sub-Genre | Movie Type | Cluster Id | Default Cnt | Group Name |
|---|---|---|---|---|---|
| 1 | 0 | 0 | 0 | 0 | Comedy |
| 1 | 101 | 0 | 0 | 0 | Screwball Comedy |
| 1 | 102 | 0 | 0 | 0 | Comedy Drama |
| 1 | 102 | 1001 | 0 | 0 | Romantic Comedy |
| 1 | 102 | 1002 | 0 | 0 | Teen Angst Comedy |
| 2 | 0 | 0 | 0 | 0 | Western |
| 1 | 101 | 0 | 12 | 1 | Movie Cluster 12 |
| 1 | 102 | 1001 | 3 | 2 | Movie Cluster 03 |
| 1 | 102 | 1001 | 41 | 1 | Movie Cluster 41 |
| 1 | 102 | 1002 | 44 | 1 | Movie Cluster 44 |
| 2 | 0 | 0 | 42 | 2 | Movie Cluster 42 |
| 2 | 0 | 0 | 88 | 1 | Movie Cluster 88 |

FIG. 6B

| Title | Movie Cluster Id |
|---|---|
| Unforgiven | 42 |
| It's A Mad, Mad, Mad, Mad World | 12 |
| High Noon | 88 |
| Silverado | 42 |
| Speechless | 41 |
| The Breakfast Club | 44 |
| Sleepless In Seattle | 3 |
| It Happened One Night | 41 |

FIG. 10

| Movie Cluster Id | *Default_cnt* |
|---|---|
| 3 | 2 |
| 12 | 1 |
| 41 | 1 |
| 42 | 2 |
| 44 | 1 |
| 88 | 1 |

FIG. 11

| Movie Cluster | Count |
|---|---|
| 3 | 1+0=1 |
| 12 | 1+2=3 |
| 41 | 2+1=3 |
| 42 | 2+1=3 |
| 44 | 1+0=1 |
| 88 | 1+0=1 |

| Movie Type | Count |
|---|---|
| Romantic Comedy (3 & 41) | 4 |
| Teen Angst Comedy (44) | 1 |

| Subgenre | Count |
|---|---|
| Screwball Comedy (12) | 3 |
| Comedy Drama (Romantic Comedy & Teen Angst Comedy) | 5 |

| Genre | Count |
|---|---|
| Comedy (Screwball Comedy & Comedy Drama) | 8 |
| Western (42 & 88) | 5 |

FIG. 12

| Movie Cluster | Recommended Movies |
|---|---|
| 3 | Rear Window<br>Vertigo<br>Rope |
| 12 | The SpongeBob Square Pants Movie<br>Black Beauty<br>Ernest Goes To Camp<br>Finding Nemo |
| 31 | Death Trap<br>The Hounds Of Baskerville<br>The Murders On Rue Morgue |
| 32 | Where The Bough Breaks<br>Blood Test<br>Echo Park<br>The Narrows |
| 34 | Brazil |
| 48 | The Thin Man |
| 55 | D.O.A.<br>Blowout<br>Vanilla Sky<br>Mystic River<br>The Factory |
| 62 | Speechless<br>Just Friends<br>When Harry Met Sally<br>Leap Year<br>Life As We Know It |
| 70 | The Breakfast Club<br>Pretty In Pink |
| 88 | It's A Mad, Mad, Mad, Mad World |

| Movie Cluster | Movies Watched Count |
|---|---|
| 3 | 3 |
| 12 | 7 |
| 31 | 3 |
| 32 | 12 |
| 34 | 5 |
| 48 | 6 |
| 55 | 18 |
| 62 | 21 |
| 70 | 1 |
| 88 | 17 |

| Genre | Comedy | | | Drama | Kids | |
|---|---|---|---|---|---|---|
| | | | | Id: 34 | Id: 12 | |
| Subgenre | Screwball Comedy Id: 88 | Comedy Drama | | Mystery Id: 48, 55 | | |
| Movie Type | | Rom. Com. Id: 62 | Teen Angst Com. Id: 70 | Murder Mystery Id: 31, 32 | Alfred Hitchcock Id: 3 | |

FIG. 19

Drama/Mystery/Murder Mystery
    Where The Bough Breaks
    Blood Test
    Echo Park
    The Narrows

Drama
    Deathtrap
    Vertigo
    The Thin Man
    Brazil

Comedy/Comedy Drama/Romantic Comedy
    Just Friends
    When Harry Met Sally
    Leap Year
    Speechless

Comedy
    Life As We Know It
    It's A Mad, Mad, Mad, Mad World
    The Breakfast Club
    Pretty In Pink

Kids
    The SpongeBob SquarePants Movie
    Black Beauty
    Ernest Goes To Camp
    Finding Nemo

METHOD AND SYSTEM FOR RECORDING RECOMMENDED CONTENT USING CLUSTERING

TECHNICAL FIELD

The present disclosure relates generally to providing recommendations for content users, and, more specifically, to a method and system for content associated with a cluster.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and timeslots as well as programming information for each information timeslot. The programming information may include the content title and other identifiers such as actor information and the like.

Because the number of channels is so great, all of the channels cannot be simultaneously displayed on the screen display. A user can scroll up and down and sideways to see various portions of the program guide for different times and channels. Because of the large number of content titles, timeslots and channels, it is often difficult to decide on a program selection to view.

In a typical content providing system, a user must pre-schedule content to be recorded within a user device. If the content is broadcasted without the user scheduling a recording, the content may forever be unavailable to the user.

SUMMARY

The present disclosure provides a system and method for generating recommendations that is particularly suited for movie recommendation but may also be applied to other.

In one aspect of the disclosure a method includes receiving a taxonomy table at a user device having content cluster identifiers therein, receiving an external recommendations list for the content cluster at the user device. The external recommendations list comprises a plurality of content identifiers each having one or more content cluster identifiers. The method further includes generating a viewed content history for content relative to the content clusters identifiers corresponding to viewed content at the user device, generating an internal recommendations list by comparing the external recommendations list to the viewed content history at the user device and displaying the internal recommendations list on a display associated with the user device.

In another aspect of the disclosure, a method includes classifying contents into clusters based on multiple dimensional content attributes, generating a taxonomy table of multiple levels of genre, sub-genre and clusters at a head end having content cluster identifiers therein, assigning one content cluster identifier to each of the content identifiers, communicating the taxonomy table to a user device, communicating an external recommendations list for the content cluster identifiers to the user device, generating a viewed content history for content relative to the content clusters corresponding to viewed content at the user device, generating an internal recommendations list by comparing the external recommendations list to the viewed content history at the user device and displaying the internal recommendations list on a display associated with the user device.

In yet another aspect of the disclosure, a user device includes a memory storing a taxonomy table having content cluster identifiers therein and an external recommendations list for the content cluster at the user device. The recommendations list has a plurality of content identifiers each having one content cluster identifier. A viewer tracking module generates a viewed content history for content relative to the content cluster identifiers that correspond to viewed content at the user device. A recommendation module generates an internal recommendations list by comparing the external recommendations list to the view content history at the user device. A display displays the internal recommendations list.

In yet another aspect of the disclosure, a method includes generating a viewed content history for content corresponding to viewed content at a user device, comparing the viewed content history and push content, storing at least one push content at the user device in response to comparing to form a recorded push content list, and displaying the recorded push content list corresponding to the push content stored in the user device on a display associated with the user device.

In another aspect of the disclosure, a user device and a viewer tracking module generating a viewed content history for content corresponding to viewed content at the user device. A recommendation recording module compares the viewed content history and push content and stores at least one push content at the user device in response comparing to form a recorded content push list. A display displays the recorded content push list corresponding to the content stored in the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6B is an example of a taxonomy tree formed in FIG. 6A.

FIG. 10 is a table illustrating watched movies.

FIG. 11 is a table illustrating default count for various cluster identifiers.

FIG. 12 is an example of a histogram.

FIG. 17 is a movie cluster table for a second example in the present disclosure.

FIG. 18 is a table of movie watch counts for the second example.

FIG. 19 is an illustration of a taxonomy tree used in the second example.

FIG. 20 is a table providing a list of internal recommendations formed according to the second example described above.

DETAILED DESCRIPTION

Figure 1:
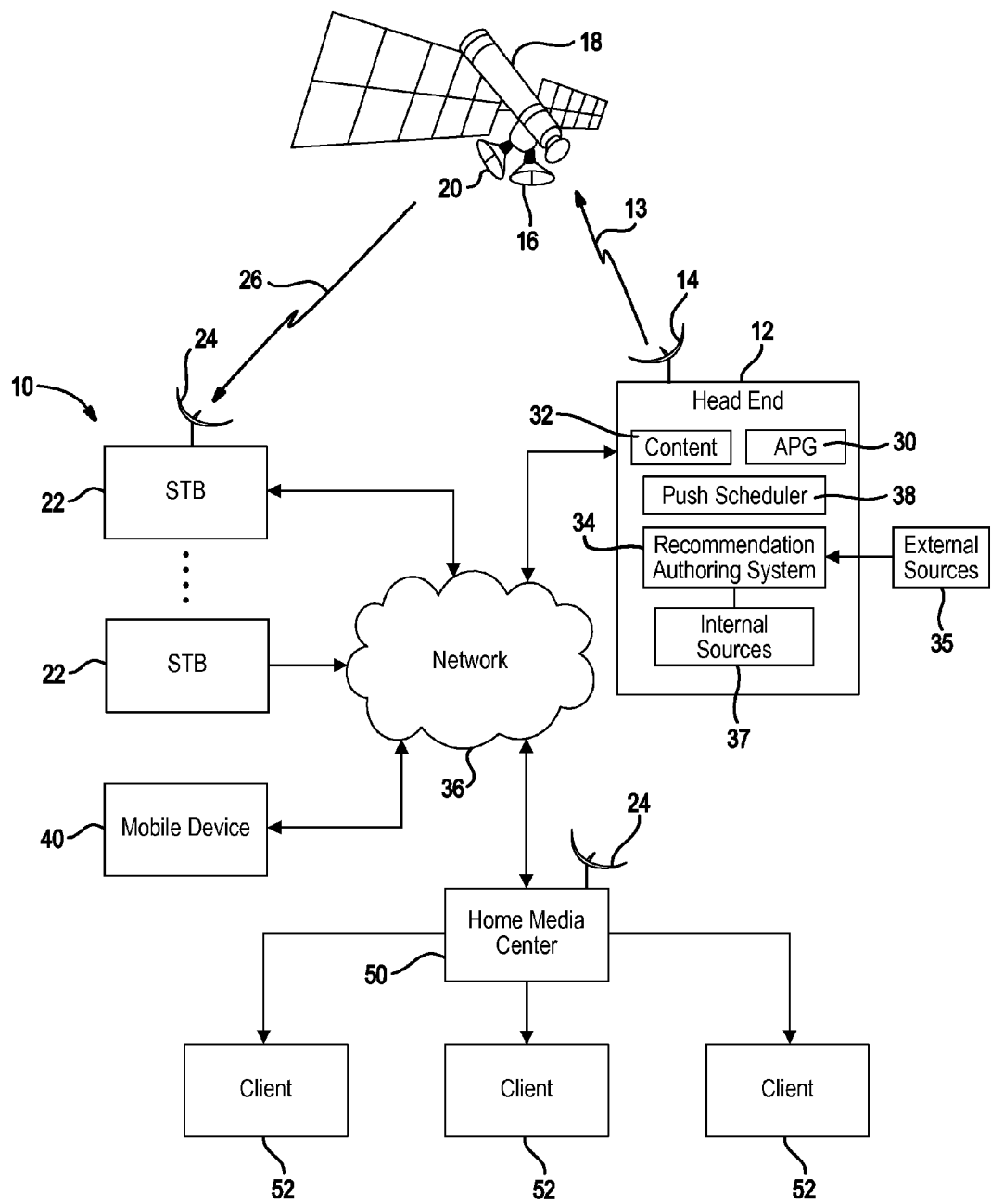
FIG. 1 is a high level block diagrammatic view of a recommendation system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the content will be used to refer to, for example, a movie or program itself. Content identifier refers to the data associated with content used for identifying the content. Machines may use an actual numeric or alphanumeric value unique to the content. People may use a title for identification. Both types and other types of data may be associated with the content for association. For program guides and recommendations list content identifiers, a cluster identifier and other data may also be provided with the content.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDS) as described below can be reallocated as desired without departing from the intended scope of the present patent.

In the following examples, recommendations of titles of various programs are provided. The content recommendations may provide a title either graphically or alpha-numerically or a combination of both. Graphically, content posters or thumbnails may be provided. Several lists are generated, sorted and processed herein. The lists may include content or program titles or one or more alphanumeric identifiers or both. The list may not contain the actual content itself.

A movie cluster is a movie group that has similar characteristics. Movie clusters may be formed at the genre level, sub-genre level or type of movie within the sub-genre level. The type is subordinate to the sub-genre. The sub-genre is subordinate to the genre. In the following example, at least one cluster identifier may be assigned to each content. Cluster identifiers may have multiple contents assigned thereto.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. As is illustrated the receiving systems are referred to as a set top box or user device 22. Each user device 22 is in communication with a respective antenna 24. Each antenna 24 receives downlink signals 26 from the transmitting antenna 20 of the satellite 18. Each user device 22 may also be referred to as satellite television receiving devices or when applied to a cable system as a television receiving device.

The head end 12 may communicate various content 30 or program guide data 32 through the satellite 18. The user device 22 may receive the content 30 and program guide data from program guide system 32 for use therein.

The head end 12 may also include a recommendation authoring system 34 for performing various functions resulting in communicating external recommendations to the user devices. The recommendation authoring system 34 builds clusters based on multiple dimensional content attributes such as genres, moods, tones, themes, keywords, movie types, audience types, actors and directors using clustering techniques, such as K-means clustering. The recommendation authoring system 34 assigns movies to movie clusters. That is, each movie is assigned at least one movie cluster identifier which associates similar movies. The clustering of similar movies may also include human expert curation. The recommendation authoring system 34 also creates a taxonomy tree and an external recommendations list that are both ultimately communicated to each of the user devices. The taxonomy tree is an organization of the movie clusters into multiple levels of genre, sub-genre and clusters. The taxonomy tree may be changed from time-to-time, resulting in a different organization of the external and internal recommendations list. The external recommendations list may include recommended content titles such as movie titles and the movie cluster identifier. Within the external recommendation list, the recommendation content are sorted and grouped under each cluster. The recommended content refers to content titles for the specific programming. Various types of programs and movies may be recommended. However, in the present example, movies are used. The recommended contents for each cluster may be based many criteria, including popularity, movie critic and/or viewer rankings, box office, expert opinions, availability, recent releases, etc. The external recommendations list may also include other types of metadata such as the channel, actors, parental ratings, review rating, the start and end times, the date and information as to whether the content will be broadcasted at a different time. In the present example, the external recommendations list is the same for each user device 22. Although, it is possible to generate variations of the external recommendations list based on some broad distinguishing categories and communicate the variations to different devices. For example, satellite receivers may receive an external recommendations list comprising content that is available via satellite, while satellite receivers with broadband connection may receive a different external recommendations list comprising satellite content as well as content available via video-on-demand broadband download. As will be described below the external recommendations list may be communicated to and modified by the user devices 22.

The recommendation authoring system 34 may be a combination of automated and operator controlled systems. The recommendation authoring system 34 may receive data from various sources including external sources 35 and internal sources 37 available from within the head end. The external sources 35 may, for example, be provided from one or more movie experts, or from TMS®, Rovi®, IMDB®, Flixster®, Rotten Tomatoes®, Nielsen® ratings, Blue Fin®, or other external sources. An example of internal sources is "What's Hot" which is a list of the most watched and talked about programming available from the system provider associated with the head end 12. The internal sources 37 may also be modified according to various marketing experts within the head end 12. The compilation of data from the external sources and internal sources may be performed to obtain the external recommendations list.

The recommendation authoring system 34 may change the content of the external recommendations list, converted into a data file or files in a binary format for communication to the user devices. The binary format data file may be included in a payload object and communicated to the various user devices. This process will be described in more detail below.

The user devices 22 may be in communication with the head end 12 through a network 36. The network 36 may be one type of network or multiple types of networks. The network 36 may, for example, be a public switched telephone network, the internet, WiMax, a mobile or cellular telephone network or other type of network.

User devices 22 illustrated in FIG. 1 may be interconnected within a household, multi-dwelling unit or commercial building. User devices 22 may be interconnected through a local network (not illustrated) such as a wireless network or a wired network. The interconnection of the user devices 22 may allow for multi-room viewing of content as well as coordinated content recording. That is, content stored on one set top box may be communicated to another set top box through the network.

A mobile device 40 may also be incorporated in the system 10. The mobile device 40 may also be in communication through the network 36 to the head end 12.

The network 36 may also be in communication with a home media center 50. The home media center 50 may be in communication with a plurality of client devices 52. The client devices 52 may be set top boxes or other clients such as an RVU® client. Thus, the home media center 50 may have one central storage device therein. The home media center 50 may be used to distribute content, channels, programs and other data to each of the client devices 52. The home media center 50 may also include an antenna 24 for communicating with the satellite 18 in a similar manner to that illustrated above with respect to the user devices 22.

A push scheduler 38 may also be incorporated into the head end 12. The push scheduler 38 may be in communication with the program guide module 32. The push scheduler 38 may provide a schedule of content to be pushed to the set top boxes. Push content is content that is communicated to the set top box without a specific user request. Push content may be communicated directly from the head end to the user devices at various times. Push content may also be communicated using carousels having a plurality of content titles associated therewith. The carousels communicate the content repeatedly to allow the user devices to ultimately store the entire content. As will be described below, the user devices may opt in to push content that is communicated based upon user device viewing history. Push content may be stored within the network partition 149 or may be stored without accounting in the user partition 148. In either case, the available user capacity of the DVR 146 may not be lowered. In other words, the push content may be stored but if the user desires to store other content, the push content may be deleted to make room.

Figure 2:
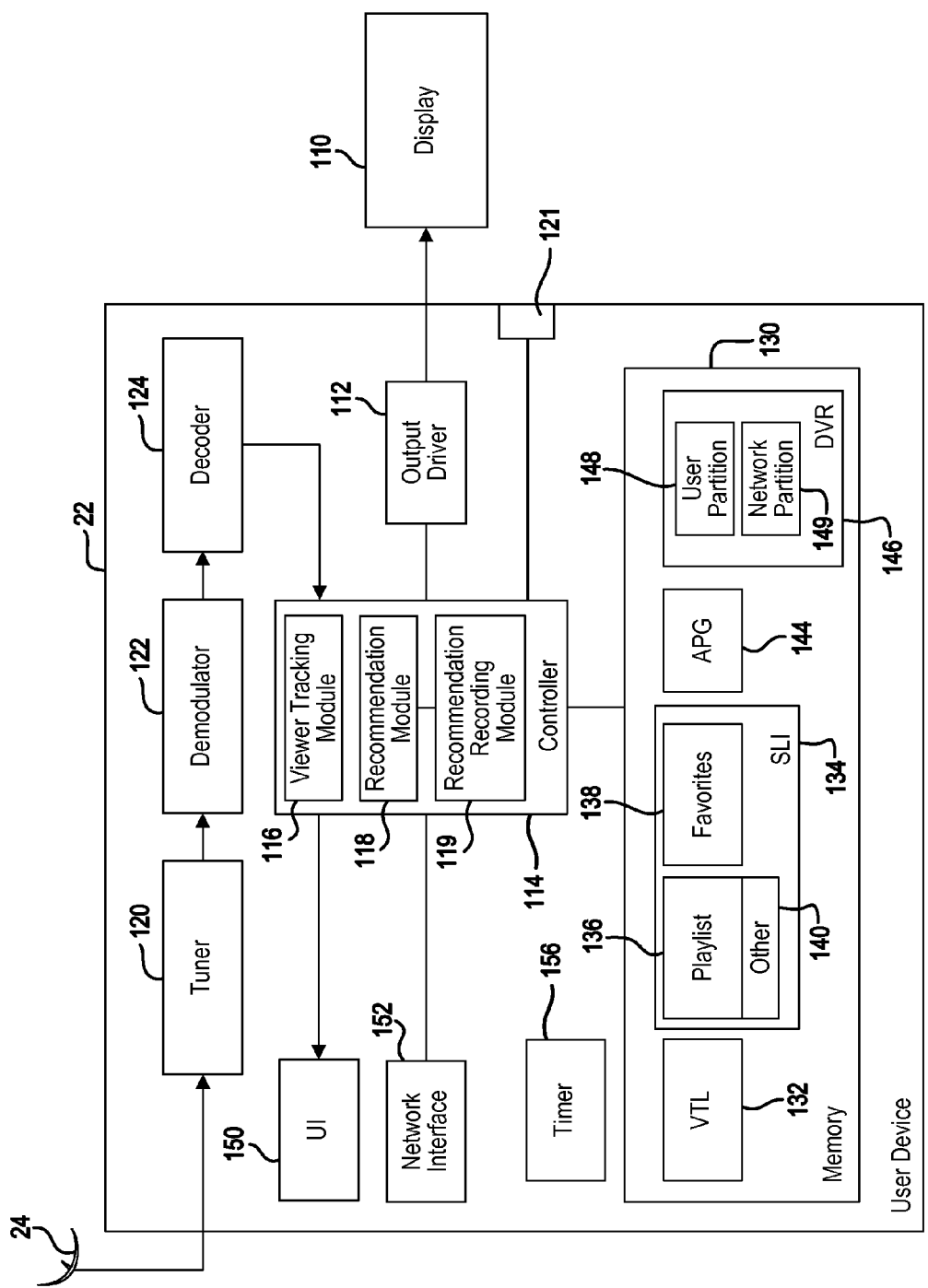
FIG. 2 is a block diagrammatic view of the user device of FIG. 1.

Referring now to FIG. 2, a user device 22, such as a set top box (STB) is illustrated in further detail. Although, a particular configuration of the user device 22 is illustrated, it is merely representative of various electronic devices with an internal controller used as a content receiving device. The antenna 24 may be one of a number of different types of antennas that includes one or more low noise blocks. The antenna 24 may be a single antenna 24 used for satellite television reception. The user device 22 may be coupled to a display 110. The display 110 may have an output driver 112 within the user device 22. The mobile device 40 may have an omni-directional antenna (not shown) coupled thereto.

A controller 114 may be a general processor such as a microprocessor that cooperates with control software. The controller 114 may be used to coordinate and control the various functions of the user device 22. These functions may include a tuner 120, a demodulator 122, a decoder 124 such as a forward error correction decoder and any buffer or other functions. The controller 114 may also be used to control the storing of an external recommendations list within the memory of the controller, automatically storing recommended content, storing user requested content in the memory, and comparing selections to already stored content.

The controller 114 may also include a viewer tracking module 116, a recommendation module 118 and a recommendation recording module 119. The viewer tracking module 116 is used for tracking and logging viewing events at the user device 22. Ultimately, the viewed content history may be logged in a viewer tracking log as will be further described below. The viewer tracking module 116 may track at least the content watched through a content identifier and a cluster identifier. As will be described below, a histogram corresponding to the movie cluster identifier may be generated at the user device 22. The recommendation module 118 may generate a list of available content (upcoming or currently available) such as movies that the user is likely to want to watch. The recommendations module 118 may receive the external recommendations list.

The controller 114 may also include a recommendation recording module 119. The recommendation recording module 119 is used to control the recording of movies based on recommendations and whether there is a sufficient amount of space available within the memory of the user device or if there is an available tuner. That is, if there is sufficient space or limited space, recording may be reduced or eliminated. The efficient use of memory space for recording recommendations is described further below. The recommendation recording module pre-records content prior to a request from the user and displays the movies in an appealing user interface. In this manner, content can be provided instantly to a user while providing a convenient user interface for access.

The tuner 120 receives the signal or data for the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multi-functional controller. Although only one tuner 120, one demodulator 122 and one decoder 124 are illustrated, multiple tuners, demodulators and decoders may be provided within a single user device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for various operational data collected during operation of the user device 22. One type of data storage includes the viewer tracking log 132 obtained and controlled by the viewer tracking module 116. The viewer tracking log(VTL) 132 includes viewer tracking log data that includes history data about content that have been watched or played back. The data of the VTL 132 may be a history data file which may be in the form of a histogram.

Another type of memory 130 is the settings and the list information (SLI) memory 134. The SLI memory 134 may store various types of data including set top box playlist data 136 that has the playlist for content saved within the user device 22. The playlist data contains content visible to users and content currently non-visible to users. Another type of data is the "favorites" settings for the user device 22. The favorites may be stored in a favorites memory 138. Other types of data may also be included in the SLI memory 134 which is illustrated as an "other" data memory 140. Another type of data in the other data memory 140 may include the channel subscription data, the blocked channels, adult channels, parental rating limits set by the user device 22, current set top box language, prioritizer data, TV resolution data, to do list data, the conditional access module identifier, and a request identifier. The request identifier may be generated at the Home Media Center 50 or user device 22 of FIG. 1 as is further described below. Further, time zone data, time of day daylight savings, status data, aspect ratio data, viewing hours data, quick tune list and a zip code may all be included within the other memory 140 of the SLI memory 134.

The memory 130 may also include advanced program guide memory 144. The advanced program guide (APG) memory 144 may store program guide data that is received within the system. The program guide data may store various amounts of data including two or more weeks worth of program guide data. The program guide data from the APG memory 144 may be communicated in various manners including through the satellite 18 of FIG. 1. The program guide data may include a content or program identifiers, and various data objects corresponding thereto. The program guide may include program characteristics and a cluster identifier for each program content. The program characteristic may include a movie cluster identifier, ratings, categories, actor, director, writer, content identifier and producer data. The data may also include various other settings.

The memory 130 may also include a digital video recorder 146. The digital video recorder 146 may be a hard drive, flash drive, or other memory device. A record of the content stored in the digital video recorder is a playlist. The playlist may be stored in the DVR 146 or a separate memory as illustrated.

The digital video recorder 146 may include a user partition 148 and a network partition 149. The network partition 149 is a portion of the memory used for storing various operating conditions, and to push content that may be provided to the user. Typically the network partition part of the DVR memory 146 is relatively small compared to the user partition 148. The user partition 148 is typically controlled by the user. The user partition 148 is used for storing content requested to be stored by the user. The digital video recorder 146 stores content upon request by the users through various types of interfaces. User requests for recording may also be communicated from a remote system. The user partition 148 as will be described further below, may be used for storing content from the recommended recording list without interaction or a specific request from the user. That is, content may be automatically stored within the user partition 148 as determined by the internal recommended recording list or by comparison of the viewing history with content being pushed to users. This content may have an extremely low priority and thus the user may overwrite the contents automatically stored within the memory.

The user device 22 may also include a user interface 150. The user interface 150 may be various types of user interfaces such as a keyboard, a remote control or front panel with push buttons, a touch screen, a voice activated interface or the like. The user interface 150 may be used to select a channel, select various information, change the volume, change the display appearance, or other functions. The user interface 150 may also be used for selecting recommendation and providing feedback for recommendations as will be described below. The user interface 150 may thus be used for generating a selection signal.

A network interface 152 may be included within the user device 22 to communicate various data through the network 36 illustrated above. The network interface 152 may be used for communication with WiFi, WiMax, WiMax mobile, wireless, cellular, or other types of communication systems. The network interface 152 may use various protocols for communication including, but not limited to, hypertext transfer protocol (HTTP).

The user device 22 may also include a timer 156 used for timing various events and keeping track of the local time. As described above, the viewer tracker module 116 may generate a history or histogram of recently watched content such as movies. The viewer tracking module 116 may only provide a history for a predetermined time period before the present time. For example, the viewer tracking module 116 may provide a history or histogram of content viewed within the last six months or other predetermined time period.

Figure 3:
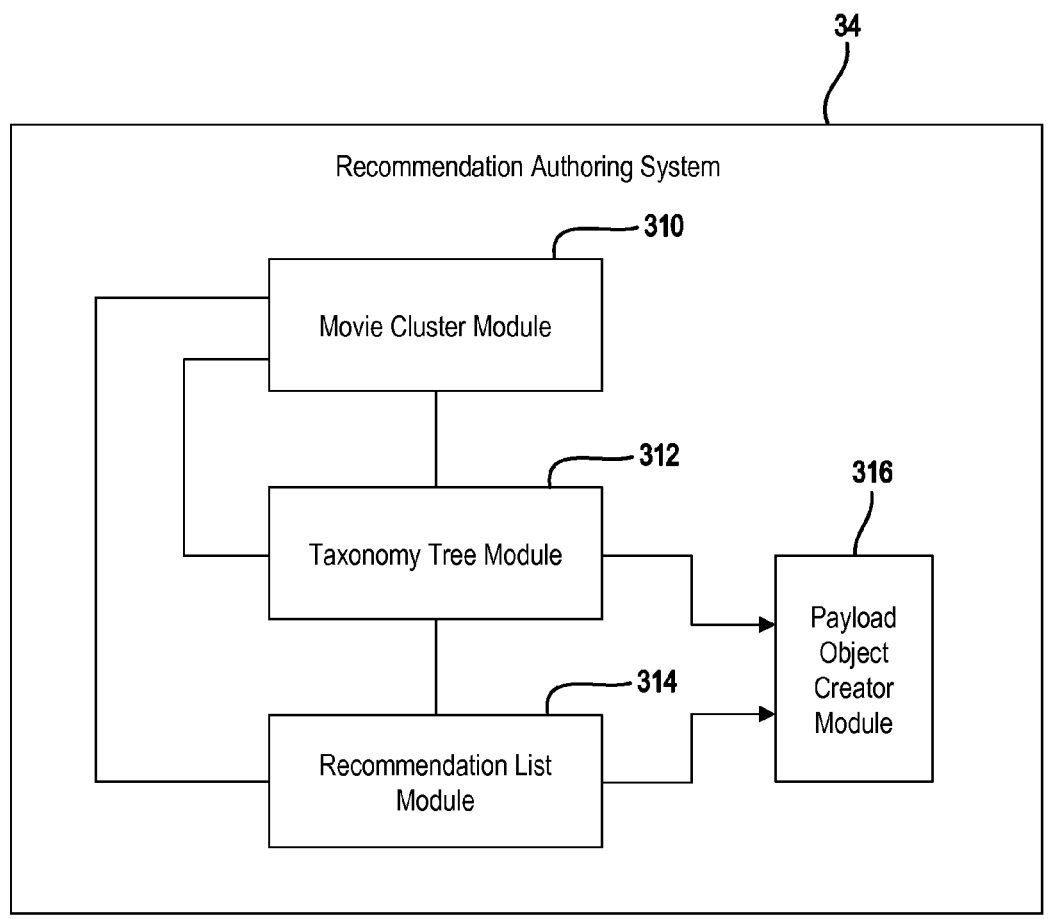
FIG. 3 is a detailed block diagrammatic view of the recommendation authoring system.

Referring now to FIG. 3, the recommendation authoring system 34 of the head end 12 is set forth in further detail. The recommendation authoring system 34 includes a movie cluster module 310 that categorizes all movies into clusters. In this example, one and only one movie cluster identifier is assigned to each movie. The movie cluster identifier may be communicated using an extended program object or a field in the extended program object. Ultimately, the movie cluster identifiers are communicated using the extended program objects to all of the user devices.

The recommendation authoring system 34 may also include a taxonomy tree module 312. The taxonomy tree module 312 organizes the movie clusters. In the present example, three levels of nodes are provided in the taxonomy tree. The highest level is genre, below genre is sub-genre and below sub-genre is movie type. In this example, one or more movie clusters are assigned to each movie type if there are enough movies to make such an assignment appropriate. However, it is also possible that one or more movie cluster identifiers would be assigned to a sub-genre, if there are not enough movie types within that sub-genre to warrant further division. Similarly, one or more movie cluster identifiers could be assigned to a genre if there are not enough sub-genres within that genre to warrant further division. In short, the taxonomy tree provides various levels and divisions. The taxonomy tree is used by the user device as well. This is described below.

The recommendation authoring system 34 may include a recommendations list module 314. The recommendations list module 314 creates a list of recommended movies for each movie cluster. Various numbers of movies may be assigned to each movie cluster. In the present example, the order of the movies within each list defines or conveys the priority of each movie. Weights may also be assigned to each movie to indicate the priority level. In this example, the first movie in the list has the highest priority.

The recommendation authoring system 34 includes a payload object creator 316. The payload object creator 316 encapsulates the recommendations list and the taxonomy tree into binary format data which is then loaded into a payload object and transmitted to the user devices.

Figures 4, 6A:
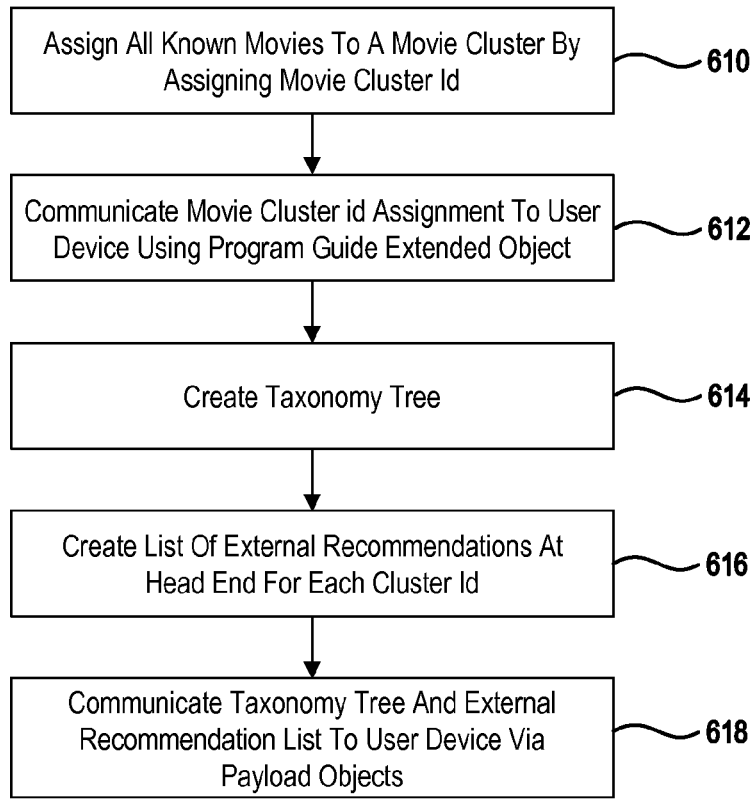
FIG. 4 is a plan view representation of a taxonomy tree.
FIG. 6A is a flow chart of a high level method for operating the head end.

Referring now to FIG. 4, an example of a movie cluster taxonomy tree is set forth. In this example, a movie cluster identifier (Id) is illustrated in the appropriate box. In box 410 all movies with a movie cluster identifier of 42 and 88 are within the "Western" category. No sub-genre or movie type sub-structure is defined under "Western" for example, if there are insufficient "Western" movies in the program guide schedule that week.

In this example, the Comedy genre 412 is illustrated having two sub-genres "Screwball Comedy" and "Comedy Drama" represented as boxes 416 and 418. Screwball Comedy has no movie types thereunder. Therefore, Screwball Comedy has a movie cluster identifier as "12." The Comedy Drama box 418 has two movie types thereunder. "Romantic Comedy" has two movie cluster identifiers 3 and 41 illustrated in box 426. Teen Angst Comedy 428 has one movie cluster identifier 44. Thus, all movies assigned to movie clusters with identifier 3 and 41 are Comedy/Comedy Drama/Romantic Comedy and all movies assigned to movie cluster identifier 44 are Comedy/Comedy Drama/Teen Angst Comedy.

In this way, the head end defines exactly how the movie clusters are defined in a tree structure of genres, sub-genres, and movie types so that all movies are placed into a specific node on the tree.

Figure 5:
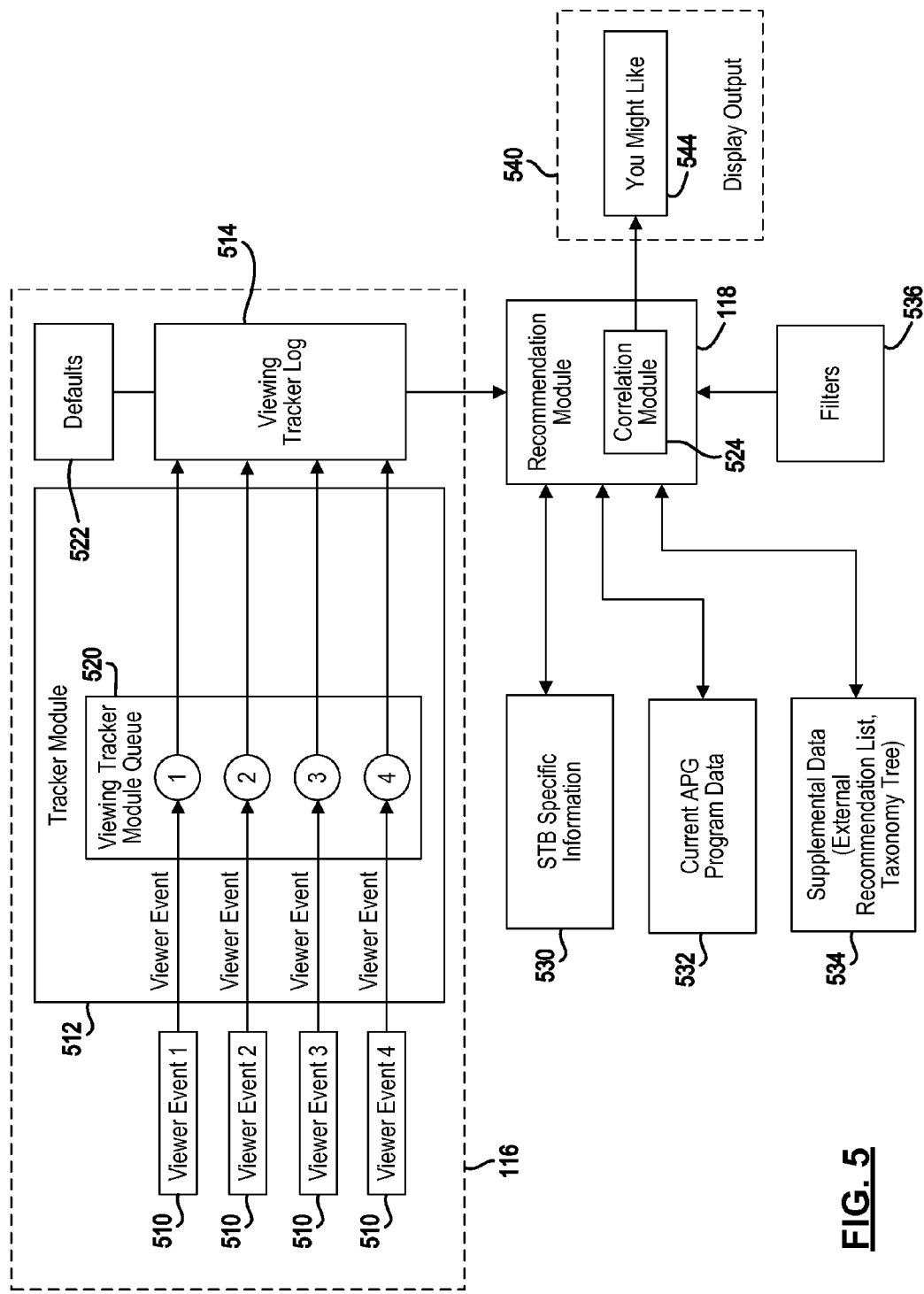
FIG. 5 is a detailed block diagrammatic view of the viewing tracker module in communication with the recommendation module.

Referring now to FIG. 5, a tracker module 512 is in communication with a viewing tracker log 514. The recommendation module 118 and its inter-connections are also illustrated in further detail. The recommendation module 118 is in communication with the viewer tracking module 116. The viewer tracking module 116 includes viewer events modules 510 which are in communication with the viewing tracker log 514. The viewing tracker log 514 may generate a viewed content history or histogram that is ultimately stored in the memory of the user device as illustrated in FIG. 2. The viewed content history or histogram may be a count of the movie cluster identifiers watched at the user device. The viewed content history may also comprise a more complex histogram including a genre histogram that has a count of the viewed content per cluster identifier for a genre, a sub-genre histogram having a second count of viewed content for each cluster identifier of a sub-genre and a type histogram having a third count of viewed content per cluster identifier for a type. The viewed content history may also comprise a viewing time histogram that has a count of the number of minutes or seconds viewed in each movie genre, sub-genre, type or cluster.

The viewer events module 510 generates data corresponding to viewing events so that the recommendation module 118 is able to generate useful recommendations likely to be of interest to the user based on the user viewed content history or histogram. The viewing events may include watching a movie in this example.

The viewing of a movie or other content may be qualified before logging. For example, live viewing events may only be logged after a predetermined amount of time has passed. A playback from memory viewing event may also be logged. The playback of a program or movie from a digital video recorder may be a playback viewing event. A channel change may also be logged by the viewer events module 510. If the viewer changes the channel that is currently being viewed live, a channel change event may be logged. The various types of events mentioned above may be used to generate a viewed content history or histogram. Thus, a predetermined time or portion of a movie may be watched before being logged.

The viewer events from the viewer events module 510 are communicated to the tracker module 512 which gathers the viewer events, analyzes them and based on the analysis, adds the entries to the viewer tracking log 514.

The viewer tracking module 116 provides data corresponding to all users of the system in this example. Individual usage tracking assigned to particular user may also be performed if user identifier is used to identify users of the system. The home media center 50 may keep track of data individually for each client. The home media center 50 could also be configured to aggregate data such as most channels watched, the viewer tracking log and other data.

The recommendation module 118 may also be in communication with set top box specific information 530 including the playlist and the channels subscribed to. These may be referred to as "channels I get."

The recommendation module 118 may also be in communication with the current program guide data 532. The program guide data 532 corresponds to the currently available programs provided by the head end. The current program APG data module 532 may be used to tune to a movie or other content.

The recommendation module 118 may also be in communication with supplemental guide data 534. The data 534 corresponds to various data objects that may be sent together with the program guide data. The supplemental guide data 534 may include the external recommendations list of movies recommended. The taxonomy tree may also be within the supplemental data 534.

A filter module 536 for filtering available content may also be used. The filter module 536 may include the watched program ratings, channel locks, adult content filters or other user selectable filters. The filters prevent content titles from appearing in the recommendations lists.

The recommendation module 118 may include a correlation module 240 that correlates the external recommendations list with the viewer tracking log and other data from the set top box specific information 530, the current APG program data 232, the supplemental data 534 and the filters 536 to generate an internal recommendations list. The internal recommendations list comprises recommendations that are personalized to the set top box in accordance with the internal viewer tracking log and other internal set top box data. Details of the actions of the correlation module 540 will be set forth below. In summary, the amount of movies watched for each of the movie cluster identifiers is used as a weight compared to the external recommendations list to ultimately generate an internal recommendations list. The internal recommendation list for users is of different granularity. It may be narrowly focused around clusters, or broadly focused around genre, according to user viewing history. User interface section headers enable users quickly understand their target interests, for example, "Murder Mystery", "Teen Angst Comedy". By including a representative selection of recommendations from each viewed movie type, the internal recommendation list also preserves distinct movie tastes of multiple users of a family viewing device, such as set top box The recommendation module 118 may generate an output to a display 240 that corresponds to the internal recommendations list. The internal recommendations list has titles, poster or other identifiers of content that may be desirable for the user. In the present example, the internal recommendations list may be a "You Might Like" display 544. The output may be in graphical, alphanumeric, or a combination of graphical and alphanumeric identifiers. The order may be determined as an order of best match. The display may also indicate whether the content is stored within the user device.

Referring now to FIG. 6A, a high level method of operating the head end is set forth. In step 610 all known movies are assigned to a movie cluster by assigning a movie cluster identifier to each movie. As mentioned above, the present example applies to movies. However, other types of content may be used according to the teaching set forth herein. Also, as mentioned above, one and only one movie cluster identifier may be assigned to each movie. A movie or other content may be received from a content provider with or without a movie cluster identifier. A movie cluster identifier may be assigned with the movie in the head end.

In step 612 a movie cluster identifier assignment is communicated to the user device using a program guide extended object. In step 614 a taxonomy tree is generated. As mentioned above, the taxonomy tree organizes the movies into a genre, sub-genre and movie type which is below the sub-genre. In step 616 a list of external recommendations is generated at the head end. Each of the clusters has a plurality of movies therein. A cluster is a grouping of movies within one level of the taxonomy tree. As mentioned above, when a movie does not fit into a movie type, it may fit within a sub-genre. If a movie does not fit into a sub-genre, the movie may fit within a genre. A further description of this is set forth below.

In step 618 the taxonomy tree and the external recommendations list is communicated to the user device encapsulated in a payload object or objects.

Referring now to FIG. 6B, a taxonomy tree definition table 650 is generated for the taxonomy tree example set forth in FIG. 4. Settings in binary data are used to represent the taxonomy tree that is ultimately communicated to the user device. For each genre, the genre identifier is set to a unique value representing the genre. The sub-genre identifier, movie type identifier, cluster identifier and default count are also set to zero. The group name field is set to the name of the genre. For each sub-genre, the genre identifier field is set to the value associated with the genre that this sub-genre is part of. The sub-genre field is set to a unique value representing the sub-genre. The movie identifier, cluster identifier and default count are also set to zero. The group name field is set to the name of the sub-genre.

A similar process is also performed for the movie types in the tree. That is, the genre identifier field is set to the value associated with the genre that this movie type is part of. The sub-genre identifier field is set to the value associated with the sub-genre that the movie type is part of. The movie type field is set to a unique value representing the movie type. The cluster identifier and the default counter are set to zero. The group name field is set to the name of the movie type. The genre field is set to the value associated with the genre that the movie cluster is associated with. The sub-genre identifier field is set the value associated with the sub-genre that this movie cluster is associated with or zero if the movie cluster is assigned to the genre node. The movie type field is set to the value associated with the movie type that the movie cluster is associated with or zero if the movie cluster is assigned to the genre node or sub-genre node. The cluster identifier is set to the movie cluster identifier value of the movie cluster. The default count is set to the value chosen by the head end and later used by the set top box or user device for the movie cluster during processing. The group name field is set to the name of the movie cluster. Using the example of FIG. 4, FIG. 6B shows rows of various groups. The first example has a genre which has been set to one, the sub-genre is set to zero in accordance with the description above, the movie type and cluster identifier have also been set to zero in accordance with the above example. The default count has also been set to zero for the same reason. The group name is "Comedy".

Under the second row, the genre of group named "Screwball Comedy" is under the genre of comedy and the genre column is thus set to one as in the previous example. In this example, the sub-genre is set to 101, the movie type zero, cluster identifier zero and default count is also zero.

The "Romantic Comedy" sub-genre is set in a similar manner with a different sub-genre identifier. The sub-genre has two movie types thereunder. The two movie types are "Romantic Comedy" and "Teen Angst Comedy" which have unique movie type identifiers associated therewith but the same genre and sub-genre numbers as the comedy drama.

"Western" is a unique genre with no sub-genre or movie type or unique cluster identifier so the genre is given a unique identifier while sub-genre, movie types and cluster identifier are all zero.

In the last six rows of the table, the movie cluster identifiers of FIG. 4 are associated with a genre, sub-genre and movie type if applicable. These are derived from the upper part of the table. For example, movie clusters 42 and 88 are associated with the genre "Western" and thus only the genre, which in this case is 2, is associated therewith. There is no sub-genre or movie type. A default count of 2 is associated with movie cluster 42 and a default count of 1 is associated with the cluster 88. Movie cluster 12 with default 1 is associated with the sub-genre "Screwball Comedy" and has the genre 1 and sub-genre 101, and there is no movie type. Movie cluster 44 with default 1 is associated with the movie type "Teen Angst Comedy" and has the genre 1, sub-genre 102 and movie type 1002. Movie clusters 3 and 41 are both associated with the movie type "Romantic Comedy" and have genre 1, sub-genre 102, and movie type 1001. Cluster 3 has default count 2 while cluster 41 has default count 1. For example, cluster 3 may be comprised of a collection of "Sweet Romantic Comedies" and cluster 41 of "Dark Romantic Comedies".

Figure 7:
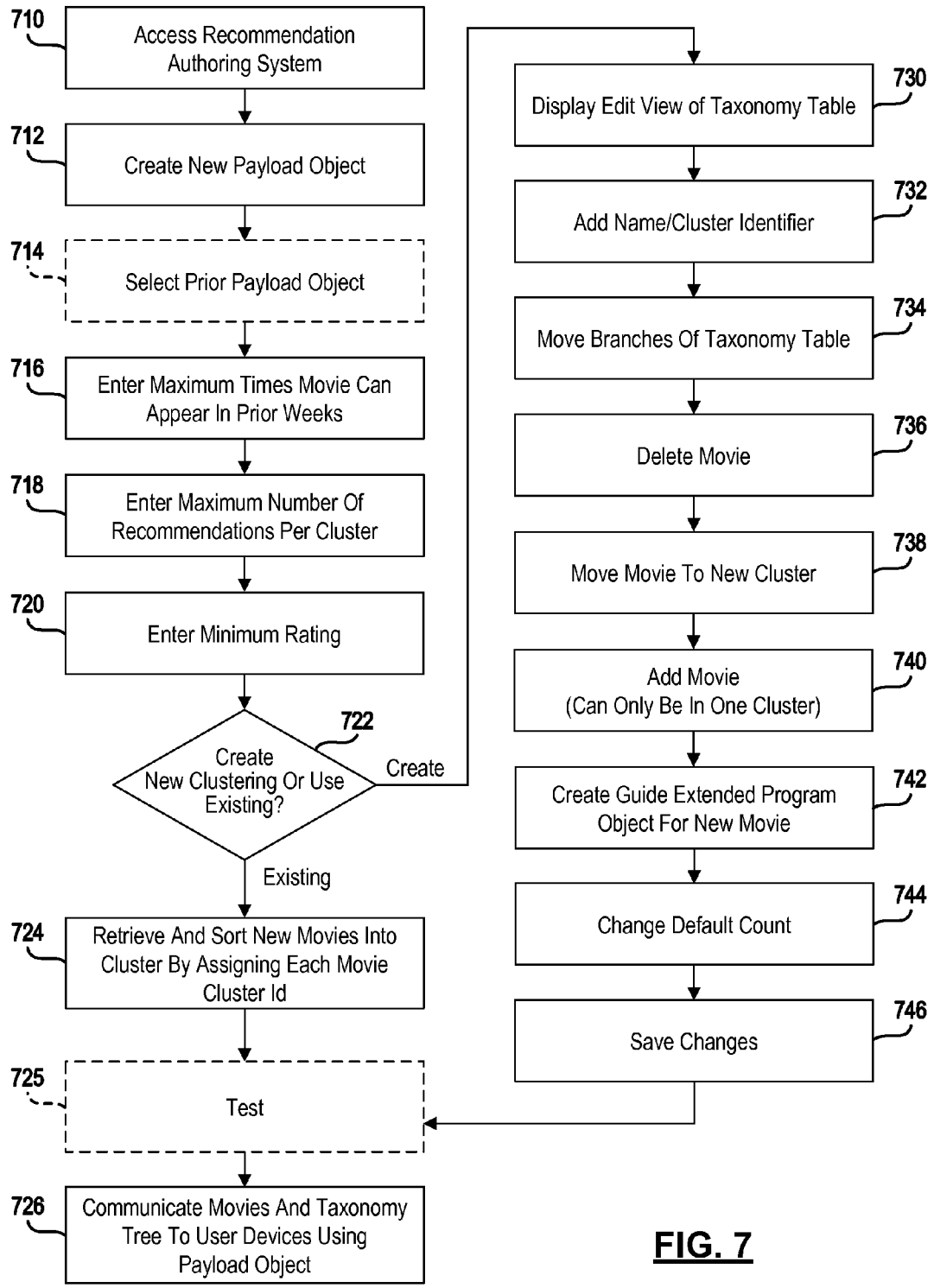
FIG. 7 is a flow chart of a method for operating the recommendation authoring system and creating or changing taxonomy tables.

Referring now to FIG. 7, a detailed description of operating the head end is set forth. In this example, an operator of the head end system is referred to as a curator. The curator accesses the recommendation authoring system in step 710. The recommendation authoring system is used to provide periodic movie recommendations lists that are sent to the user devices. The movie recommendations list may be provided on a regular basis such as weekly. Of course, bi-weekly, twice a week or other periods may be used. In step 712 a new payload object is created. In step 714 the payload object from a prior period may be used and modified to form a new payload object. In step 716 the maximum number of times a movie can appear in previous weeks recommendations is set. This is to limit the number of weeks a movie is recommended. In step 718 the maximum number of recommendations per cluster is set. This ultimately allows the movies displayed to the user to be distributed throughout various clusters to provide variety. In step 720 a minimum quality rating may be established. That is, an external service may have user or quality ratings associated therewith. One example of a quality rating service is Flixter®. The minimum quality rating may, for example, be a start rating or a percentage-like rating.

In step 722, it is determined whether an existing clustering is to be used or a new clustering is to be created. After step 722 when an existing clustering is used, steps 724 performed. Step 724 retrieves and sorts new movies into a cluster by assigning each new movie or content a movie cluster identifier.

Testing of the system may also be performed. An optional step 725 allows the curator to simulate the movie recommendations page. This action may mimic the actions of a set top box with histogram data. Simulated internal recommended movie lists may therefore be created and viewed to determine why various movies were added.

In step 726, movie recommendations and a taxonomy tree are communicated to the devices using payload objects.

Referring back to step 722 when the curator seeks to create a new clustering, step 730 is performed. In step 730, an edit view of a taxonomy table may be displayed to the curator. In step 732 a name may be added as well as a cluster identifier. In step 734 a movie may be deleted from the previous table. In step 738 a movie cluster may be added or moved. In step 740 a movie may be added to the movie cluster. It should be noted that in our example only one cluster identifier may be associated with a movie. In step 742, an extended program guide object for the movie is created. The extended program guide object may be specifically created for the new movie or may be used to convey a plurality of movies. After step 742, step 744 creates a default count corresponding to the number of movies allowed for each of the clusters. In step 746, changes are saved for the new or edited taxonomy table. After step 746, the taxonomy table may be communicated to the user devices using payload objects or program objects in step 726. Of course, the changed taxonomy table may be tested in step 725.

Figure 8:
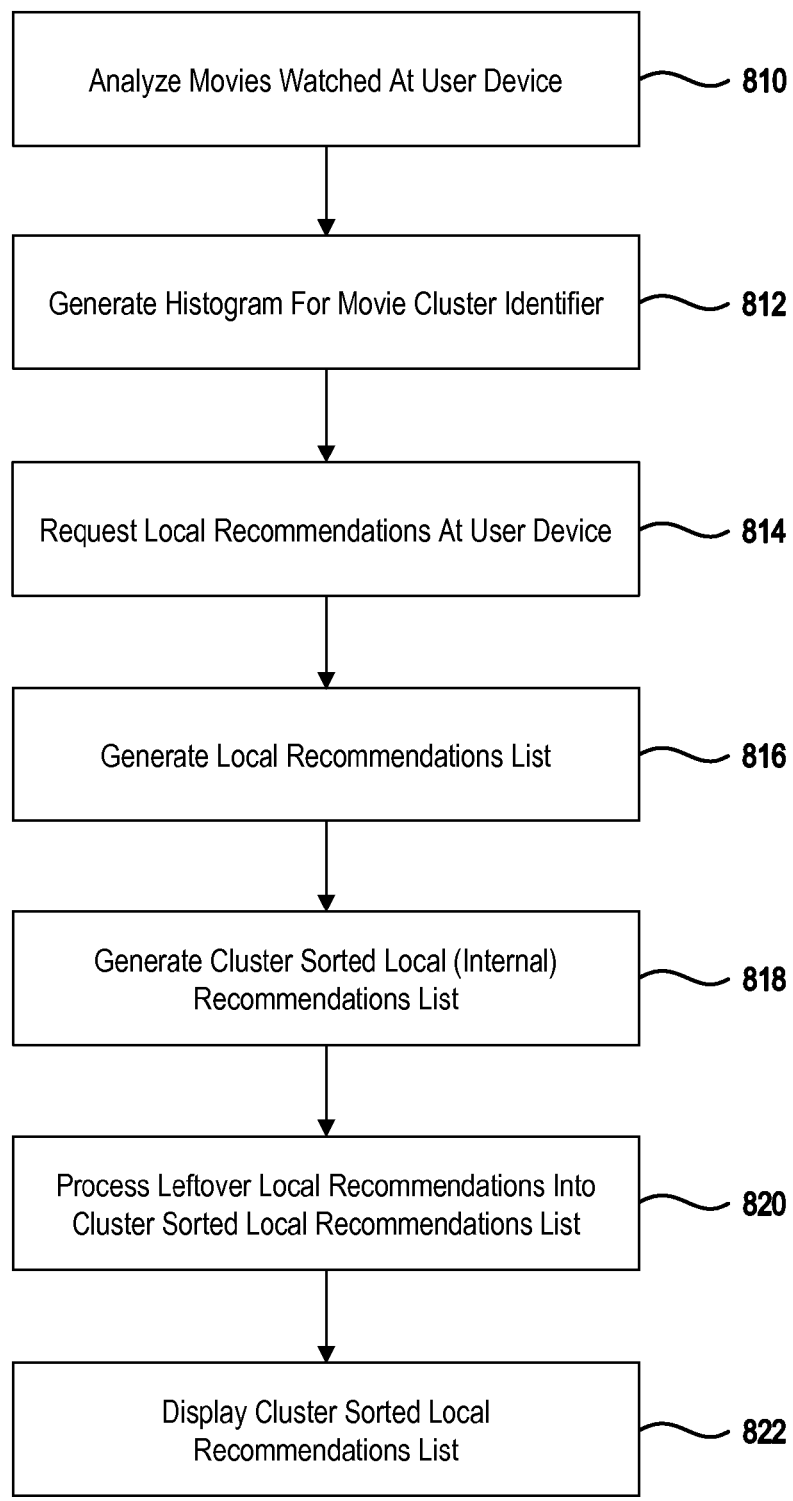
FIG. 8 is a flow chart of a high level method for operating a set top box and displaying sorted local recommendations.

Referring now to FIG. 8, a high level method of operating a user receiving device is set forth. In step 810 the content watched such as movie content is analyzed by the user device. In this example, the viewer tracking log tracks the movies watched at the user device. In step 812, a history such as a histogram for each movie cluster identifier is generated. It should be noted that a predetermined amount of user viewed data may be kept. That is, data for a predetermined period prior to the generation of the histogram may be used or displayed. For example, six months worth of data may be used for generating a local recommendation as described below. Data in the histogram older than a predetermined time such as six months may be discarded.

In step 814, a local recommendations list is requested by the user device. This list may be performed by selecting a menu selection such as a "cinema" selection or the like. In step 816 a local recommendations list is generated. It should be noted that this list may be generated after receiving an external recommendations list. This step may be performed at the time the external recommendations list is received or upon request. A cluster sorted local recommendations list is generated in step 818. The generation of the cluster sorted recommendations list will be described below. However, it should be noted that the movie cluster identifier sorted local recommendations list generated internally at the user device is weighted toward the cluster identifiers most viewed at the user device. This may be referred to as an internal recommendations list.

In step 820, leftover local recommendations may also be placed into the local recommendations list. In step 822, the cluster sorted local recommendations list is displayed on the display associated with the user device. Ultimately, the cluster sorted internal recommendations list generated in step 822 uses the histograms, the taxonomy tree and the external recommendations list.

Figure 9:
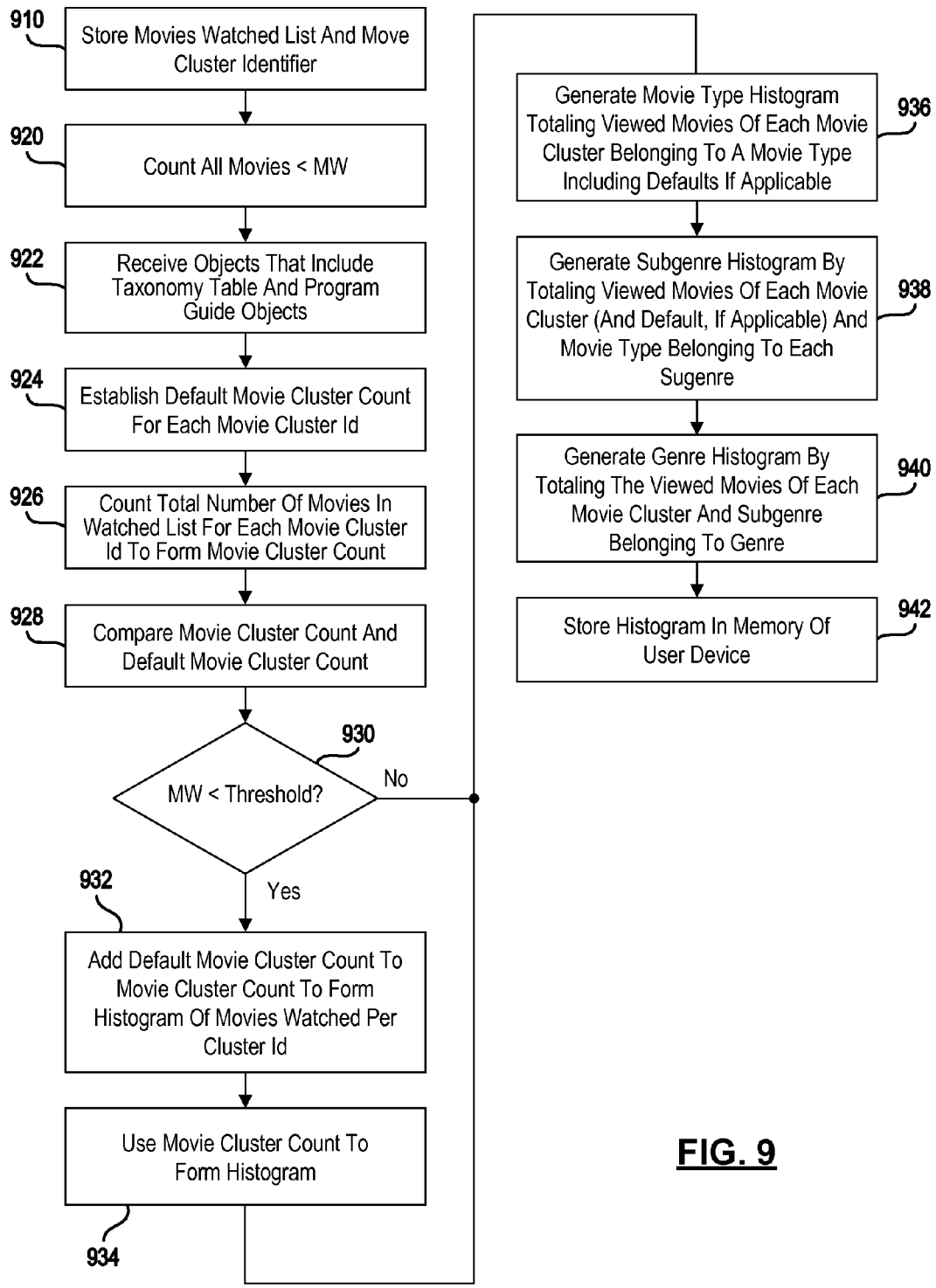
FIG. 9 is a flow chart of a method for generating histograms.

Referring now to FIG. 9, a method for analyzing watched movies is set forth. In step 910 movies watched list is stored along with a movie cluster identifier associated with each of the movies. In step 912 a histogram is generated by counting the total number of viewed movies having each movie cluster identifier value. In step 920, a count of all of the movies is generated as the movies watched "MW." The objects that include the taxonomy table and the program guide objects are received in step 922. In step 924 a default movie count for each movie cluster identifier is established. This default movie count will be described in detail below.

In step 926 the total number of movies in the watch list for each movie cluster identifier is counted to form a movie cluster count. In step 928, the movie cluster count and the default movie cluster count are compared. Of course, the process set forth in FIG. 9 may not take place if the overall movie watched count MW is not at least a predetermined amount.

In step 930, when the overall movies watched is less than a threshold in step 930, Step 932 adds the default movie cluster count to the total number of movies watched for the particular cluster identifier and continue to step 934. In step 930, when the overall movies watched is greater than the threshold, step 934 is performed. In step 934 the movie cluster count of the histogram is used. After step 934, step 936 generates a movie type histogram totaling the viewed movies of the each movie cluster belonging to a movie type including the defaults if applicable.

In step 938 a sub-genre histogram is generated by totaling the viewed movies of each movie cluster and the default if applicable and the movie type belonging to each sub-genre.

In step 940 a genre histogram is generated by totaling the viewed movies of each movie cluster and sub-genre belonging to each genre.

In step 942 the histogram is stored in the memory of the user device.

Referring now to FIG. 10, a table providing examples of movies watched are set forth. The movie UNFORGIVEN is in a movie cluster identifier 42, IT'S A MAD MAD MAD MAD WORLD is in movie cluster identifier 12, HIGH NOON is in movie cluster identifier 88, SILVERADO is in movie cluster identifier 42, SPEECHLESS is in movie cluster identifier 41, THE BREAKFAST CLUB is in movie cluster identifier 44, SLEEPLESS IN SEATTLE is in movie cluster identifier 3 and IT HAPPENED ONE NIGHT is in movie cluster 41.

Referring now to FIG. 11, default counts for each movie cluster are set forth. The default counts for each movie cluster allow a new user device without any personal viewing history to generate a default viewing histogram. The default viewing histogram will represent a generic distribution of popular movie types. The default counts allow the head end to control the proportions of each genre, sub-genre and movie type in the default recommendation list. As the user views movies according to their personal taste, the generic component of the recommendation list gradually reduces and the personal component increases. In the taxonomy example described with FIG. 6B, movie cluster identifier 3 has a default count of two. Movie cluster identifier 41 has a default count of one. Both clusters are included in the "Romantic Comedy" group, so that the default recommendation list will include twice as many "Sweet Romantic Comedies" as "Dark Romantic Comedies". Similarly, movie cluster 12 represents "Screwball Comedies" and cluster 44 represents "Teen Angst Comedies", both with default one, so that movies in the "Comedy" genre will have three times as many "Romance Comedy", as "Screwball Comedy" or "Teen Angst Comedy". Movie cluster 42 with default two and cluster 88 with default one both represent movies in the "Western" genre, so that the default recommendation list would include movies from the "Comedy" and "Western" genres in the ratio 5 to 3.

Referring now to FIG. 12, a histogram is generated using the method set forth in FIG. 9 with the examples set forth in FIGS. 10 and 11. For example, movie cluster 3 has a count of one plus the default count of zero which has a total count of 1. Movie cluster 12 has a count of 1 plus the default count of two for a total count of three. Each total count corresponds to the number of movies watched in FIG. 10 along with the default count. In the second two columns the movie type count for "Romantic Comedy" which corresponds to movie clusters 3 and 41 has a total count of four from the movie cluster 3 and 12 rows of column 2. "Teen Angst Comedy" which corresponds to movie cluster 44 has only one count. Under the sub-genre column "Screwball Comedy" corresponds to movie cluster 12 and has a count of three. "Comedy Drama" which includes both "Romantic Comedy" and "Teen Angst Comedy" has a total of five which corresponds to the sum of the fourth column, the rows 1 and 2.

The genre column includes comedy as the first genre which includes both "Screwball Comedy" and "Comedy Drama." The count for the Comedy genre is 8 which is the total of the two rows of the sixth column. "Westerns" correspond to movie cluster 42 and 88 which from the second column has a total of five counts.

Figure 13:
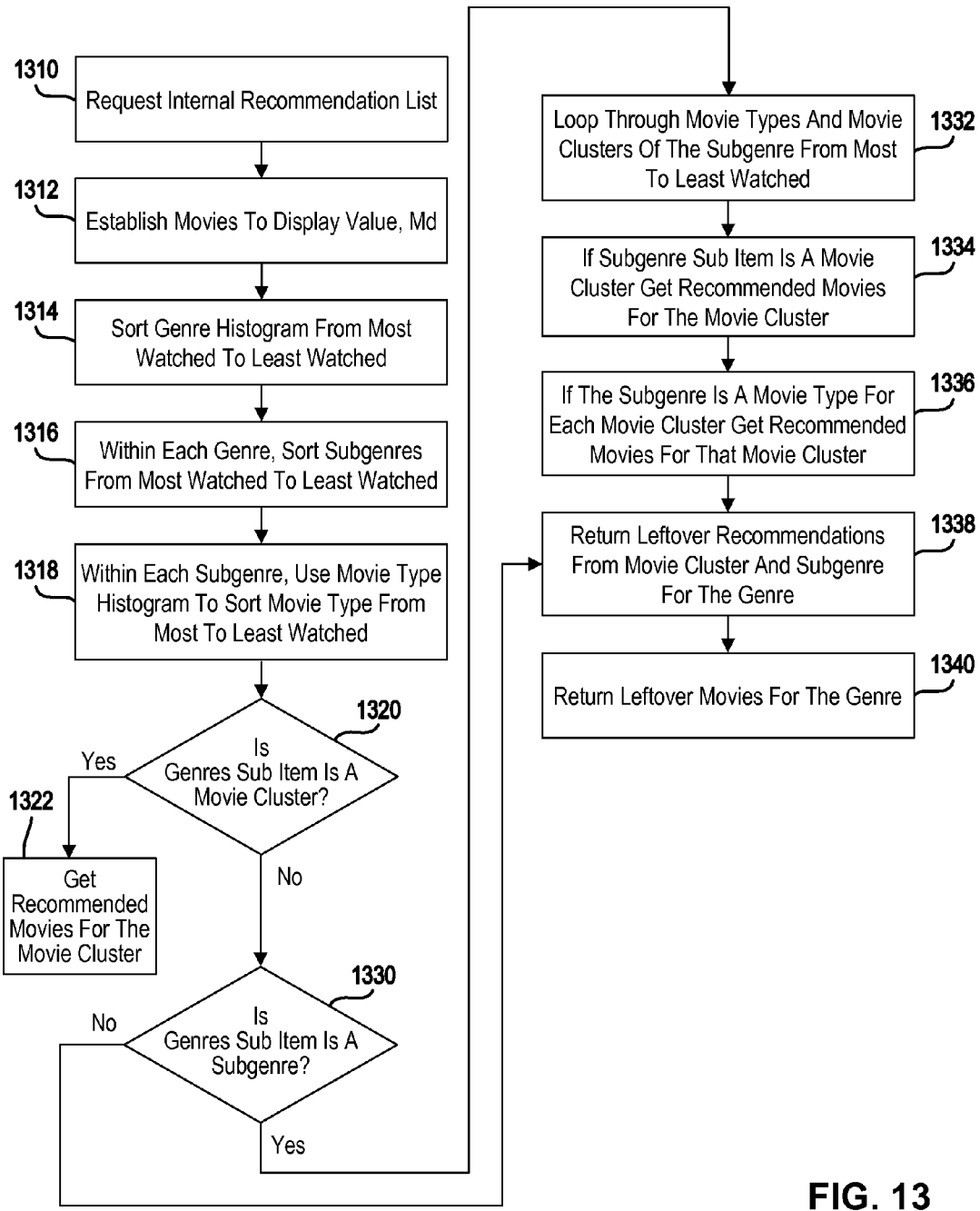
FIG. 13 is a flow chart of a method for generating recommended movie lists.

Referring now to FIG. 13, a method for generating a recommended movie list for display on a screen associated with the user device is set forth. This method selects movies to recommend from each movie cluster in proportion to the movie count associated with that cluster in the viewed history of the user device. In a simplified embodiment, the internal recommendation list may be ordered according to most watched movie type, i.e., from most watched to least watched movie type. In a preferred embodiment, the internal recommendation list may be ordered according to most watched genres, and within each genre, ordered according to the most watched sub-genres, and within each sub-genre, ordered according to the most watched movie types. Furthermore, in a user-interface wherein movie posters are displayed in rows of four posters, the preferred embodiment organizes the internal recommendation list with similar movies in each row of four movie posters. In step 1310 an internal recommendations list is requested. The internal recommendations list may be initiated when a particular sub-menu or menu item is selected. In step 1312 the number of movies to display value is established at "Md." The number movies to display value is set so that a wide number of movies that the user may be interested in are displayed on the screen display.

In step 1314 the genre histogram is sorted from the most watched to the least watched. In the above example, the most watched genre is "Comedy" and the second most watched is "Western."

In step 1316 the sub-genres within each genre are sorted from the most watched to the least watched. In the above example, the most watched sub-genre of comedy is "Romantic Comedy" and "Teen Angst Comedy" while the second most watched is "Screwball Comedy." In step 1318 within each sub-genre the movie type histogram is sorted in order of movie type from the most to the least watched. In the above example, "Romantic Comedy" is the most watched while "Teen Angst" is the least watched movie type under the sub-genre of Comedy Drama which is under the genre of comedy.

Referring now to figure 1320, if the genre sub-item is a movie cluster Step 1322 is used to get the recommended movies for the movie cluster. This process will be described in detail below.

In Step 1320 if the genre sub-item is not a movie cluster, Step 1330 is performed which determines whether the genre sub-item is a sub-genre. If the genre sub-item is a sub-genre Step 1332 is performed. In Step 1332 the movie types are looped through and the movie clusters of the sub-genre are arranged from most to least watched. In Step 1330, if the genre sub-item is not a Subgenre, Step 1338 will follow.

In Step 1334 if the sub-genre sub-item is a movie cluster the recommended movies for the movie cluster are obtained. In Step 1336 the sub-genre is a movie type for each movie cluster the recommended movies for that movie cluster are obtained. In Step 1338 the leftover recommendations from the movie cluster and the sub-genre are obtained. This process will be described in detail below. In Step 1340 the leftover movies for the genre are also obtained and added to the recommended movie list.

Figure 14:
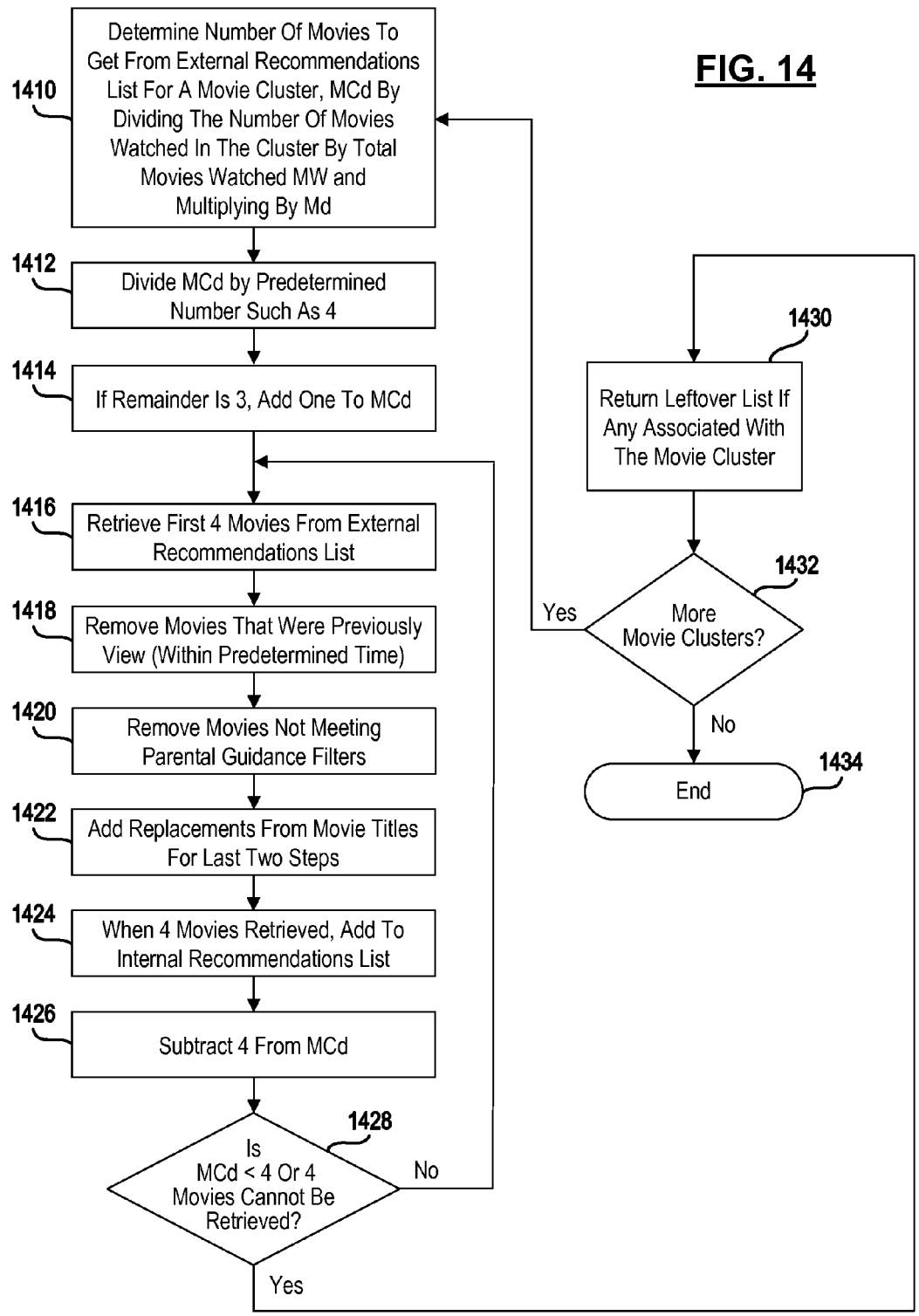
FIG. 14 is a flow chart for getting movies for a movie cluster.

Referring now to FIG. 14, a method for generating internal recommendations of the movies or content for each movie cluster or cluster is set forth. This process further defines step 1322 in FIG. 13. In Step 1410 the number of movies or content to get from the external recommendations list is determined for a movie cluster (MCd) by dividing the number of movies watched in this movie cluster by the total number of movies watched (MW) and multiplying by the target number of movies to be displayed (Md). This number may be rounded up or down to the nearest integer. In Step 1412 the MCd is divided by a predetermined number such as 4. In Step 1414 if the remainder is less than 3 add 1 to MCd.

In Step 1416 the first four movies of the external recommendation list for the movie cluster is retrieved. In Step 1418 movies are removed that were previously viewed within a predetermined viewing history. That is, if the movie was watched in the near past, the movie is removed from being included in the internal recommendations list. In Step 1420 movies are removed that do not meet the general parental guidance filters. In Step 1422 replacements for movies in steps that were removed in Steps 1418 and 1420 are obtained. In Step 1424 when four movies are retrieved they are added to the internal recommendations list. After Step 1424, Step 1426 subtracts 4 from the number of movies to get MCd.

In Step 1428 if MCd is not less than 4 or 4 movies can be retrieved, Steps 1416-1426 are once again performed.

In Step 1428 if the MCd is less than 4 or 4 movies cannot be retrieved, Step 1430 returns a leftover list of movies associated with a particular movie cluster to the genre, sub-genre or movie type that the movie cluster was assigned to. If there are any more movie clusters to be analyzed, Steps 1410-1430 are again performed. In Step 1432 if no more movie clusters are in the list, Step 1434 is performed.

Figure 15:
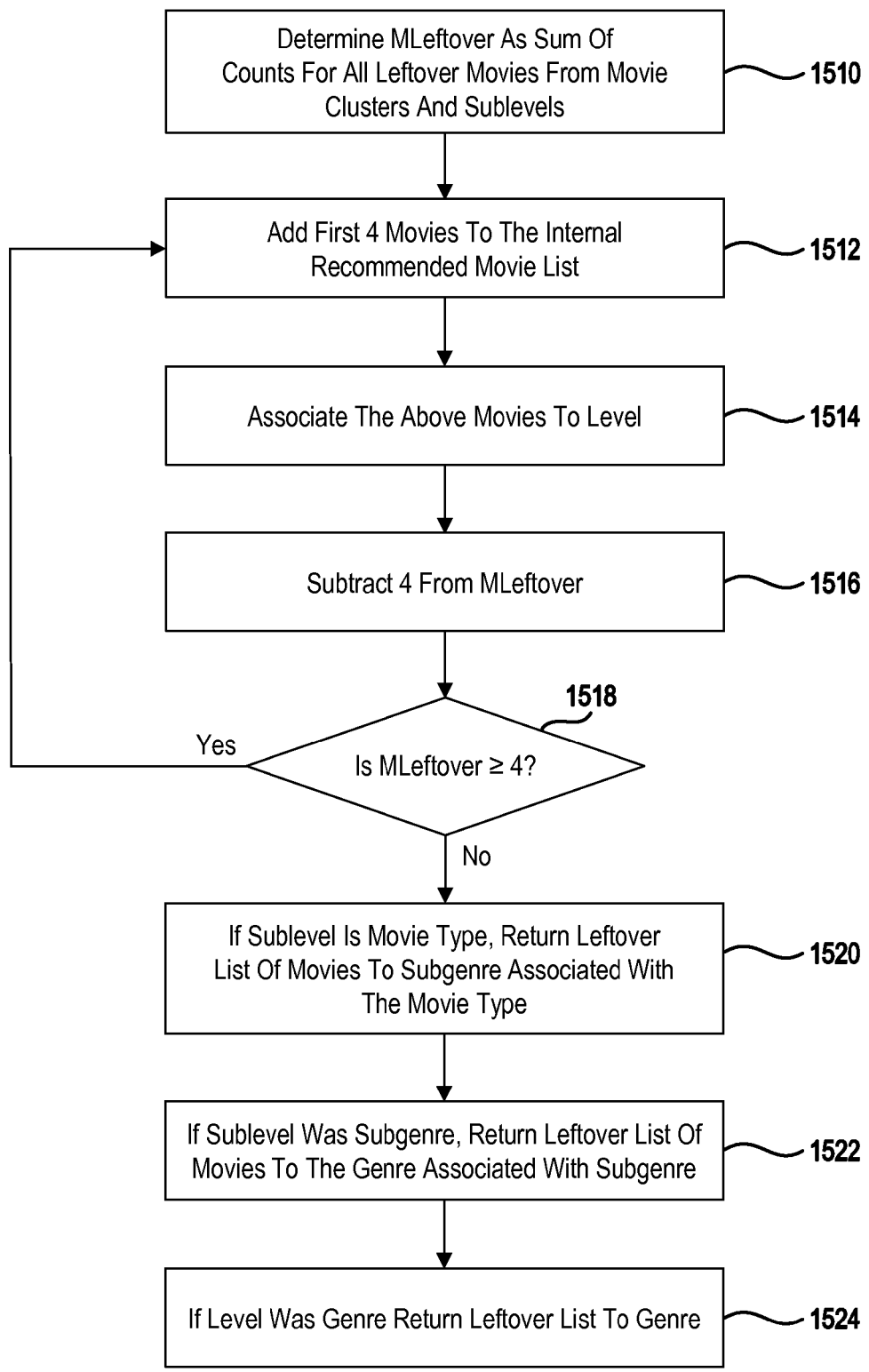
FIG. 15 is a flow chart of a method for handling leftover recommended movies for a genre/sub-genre or movie type.

Referring now to FIG. 15, the handling of leftover content for a level such as a genre, sub-genre or type is set forth. Again leftover content is content on the internal recommended list not selected for display at the lower levels of sub-genre or types in the processes described in FIGS. 13 and 14. More specifically, this method further defines steps 1338 and 1340 of FIG. 13. Again, this process applies to other types of content outside of movies. In Step 1510 all the leftover movies from the movie clusters and sub-levels of this level from the highest count to the lowest count are sorted and summed. The sum is referred to as "Mleftover". When Mleftover is greater than or equal to 4, Steps 1512, 1514 and 1516 are performed. That is, Step 1512 adds the first 4 movies to the internal recommended movie list. In Step 1514 the movies are associated to the level such as genre, sub-genre or movie type that this algorithm is being applied to. The number 4 in this example is subtracted from Mleftover. In Step 1518 if Mleftover is greater than or equal to 4, Steps 1512 through 1516 are again performed. When Mleftover is not greater than or equal to 4, Step 1520 determines whether the sub-level is a movie type and returns the leftover list of movies to the sub-genre associated with the movie type. After Step 1520, Step 1522 determines if the level was a sub-genre and returns the leftover list of movies to the genre associated with the sub-genre. After Step 1522, Step 1524 determines if the level was a genre and returns the leftover list to the genre. If there are no leftover movies then no leftover movies will be added to the leftover movie list.

Figure 16:
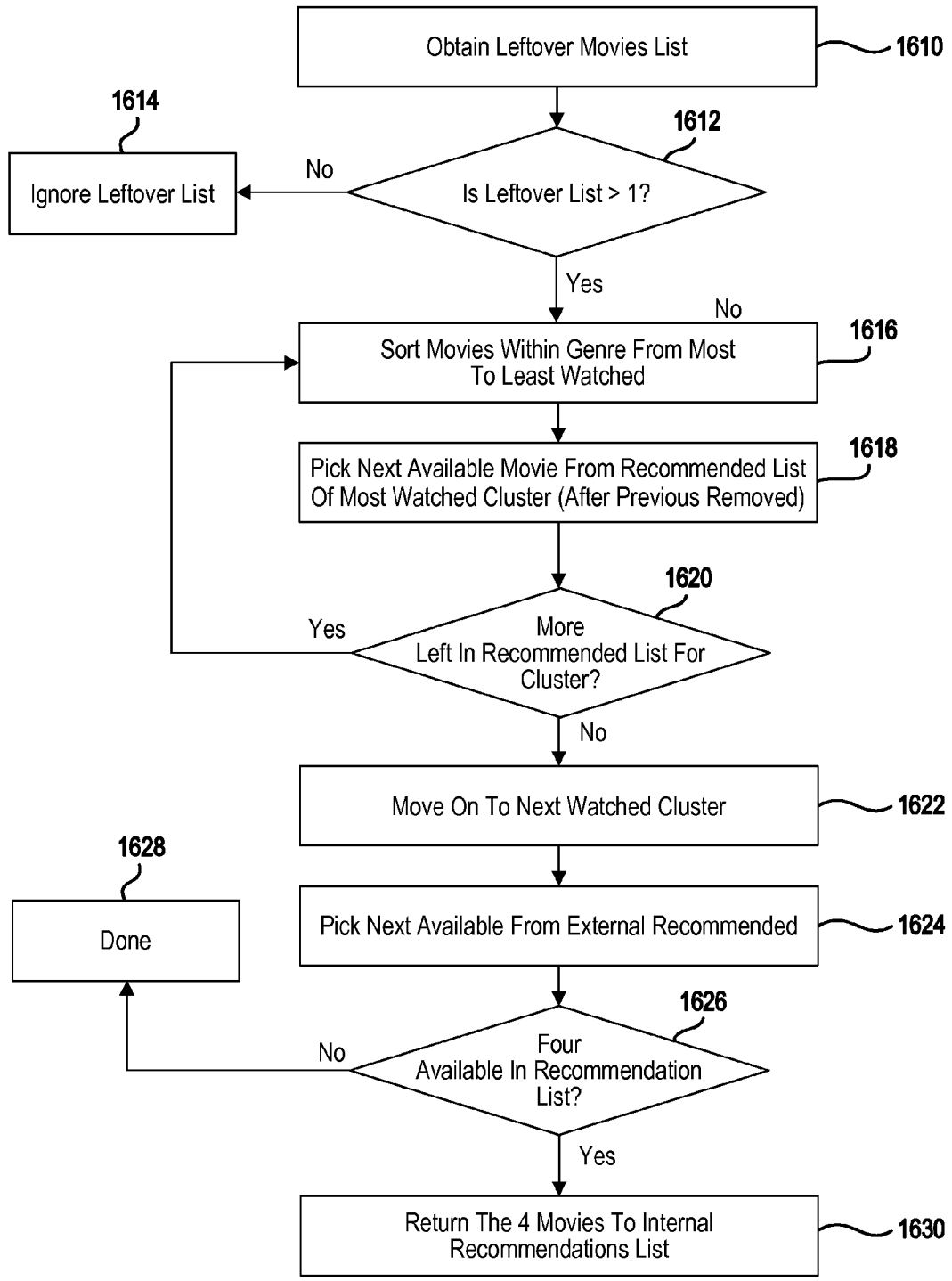
FIG. 16 is a flow chart of a method for handling final genre leftover recommended movies.

Referring now to FIG. 16, a method for handling the final set of leftover movies for a genre is set forth. This is essentially the leftover content of the leftover process of FIG. 15. It should be noted that at this time, all recommended content for a genre including sub-genres, types, and clusters have been handled. Although this process is described for movies other content types may use this process. In this example, one, two or three movies assigned to a genre may not have been handled in the previous figures. In Step 1610 the leftover movie list is obtained. In Step 1612 it is determined whether the leftover list is greater than one. If the leftover list is not greater than one, Step 1614 ignores the leftover list. In Step 1612 if the leftover list is greater than one Step 1616 is performed which sorts the movies within the genre from the most watched to the least watched. In Step 1618 the next available movie is picked from the recommended list from the most watched cluster. This is performed after the previous algorithms have been performed. After Step 1618, Step 1620 determines whether there are more left in the recommended list for the cluster. If there are, Steps 1616 through 1620 are again performed. In Step 1620 when no more leftovers are in the recommended list for the clusters, Step 1622 repeats the process with the next watched cluster. In Step 1624 the next available cluster is used to obtain the next list to add from the external recommendations list to the internal recommendations list. In Step 1626 if there are not four available movies, Step 1628 does not return any content or content identifiers to the internal recommendations list. After Step 1626 if there are four available recommended movies Step 1630 returns the four movies to the internal recommendations list.

Referring now to FIG. 17, a more detailed movie cluster count is provided in the table 1710 for a more detailed analysis to illustrate the processes described above in FIGS. 13 through 16. In this second example, FIG. 17 has ten different movie clusters. Each of the movie clusters will now be described in detail. By way of example, the first movie cluster, 1, in the first row includes three movies that include REAR WINDOW, VERTIGO and ROPE. The second movie cluster, 12, includes THE SPONGEBOB SQUARE PANTS MOVIE, BLACK BEAUTY, ERNEST GOES TO CAMP and FINDING NEMO. The third movie cluster, 31, includes DEATH TRAP, THE HOUNDS OF BASKERVILLE and THE MURDERS ON RUE MORGUE. The fourth movie cluster, 32, includes WHERE THE BOW BREAKS, BROADCAST, ECHO PARK and THE NARROWS. The fifth movie cluster, 34, includes BRAZIL. The sixth movie cluster, 48, includes THE THIN MAN. The seventh movie cluster includes D.O.A., BLOWOUT, VANILLA SKY, MYSTIC RIVER and THE FACTORY. The eight movie cluster 62, includes SPEECHLESS, JUST FRIENDS, WHEN HARRY MET SALLY, LEAP YEAR and LIFE AS WE KNOW IT. The ninth movie cluster, 70, includes THE BREAKFAST CLUB and PRETTY IN PINK. The tenth movie cluster, 88, includes IT'S A MAD MAD MAD MAD WORLD.

Referring now to FIG. 18, a recommended movie cluster count is provided in table 1810. Two columns including a movie cluster identifier and a count for each movie cluster identifier is set forth. Thus, as is seen, movie cluster 3 has three counted movies. Cluster 12 has seven counted movies, movie cluster 31 has a count of 3, movie cluster 32 has a count of 12, movie cluster 34 has a count of 5, movie cluster 48 has a count of 6, movie cluster 55 has a count of 18, movie cluster 62 has a count of 21, movie cluster 70 has a count of 1 and movie cluster 88 has a count of 17. The count corresponds to the number of movies within the movie cluster that were watched subject to the qualifications described above such as only partial viewing, with the last 6 months or other time period etc.

Referring now to FIG. 19, a taxonomy tree 1910 is provided for the present example. In this example, the genres correspond to Comedy, Drama (cluster Id 34) and Kids (cluster Id 12). Under comedy the sub-genres are Screwball Comedy (cluster Id 88) and Comedy Drama. Under the sub-genres Comedy Drama, the movie types Romantic Comedies (cluster Id 62) and Teen Angst Comedies (cluster Id 70) are set forth. Under the Drama genre (cluster Id 34), Mystery (cluster Id's 48, 55) is set forth. The Mystery sub-genre has a Murder Mysteries movie type (cluster Id's 31, 32) and an Alfred Hitchcock movie type (cluster Id 3) thereunder. The Kids genre has no sub-genre or movie type associated therewith.

Referring now to FIG. 20, an internal recommendations list 2010 generated using the above mention processes is set forth. In the following, the processes are applied to the data in FIGS. 17-19. The movies to display (Md) from the internal recommendations list in the present example is set to twenty. The movies watched is determined from FIG. 18 which totals to 93. The genres watched include Dramas at a count of 47, Comedies at a count of 39 and Kids at a count of 7. Thus, drama would be the first genre to be processed. The sub-genres of drama included Mystery which has a count of 42. These are obtained by summing the movie cluster identifiers 48 and 55 of FIG. 18. The Drama/Mystery movie types watched are Murder Mystery at a count of 15 and Hitchcock at a count of 3. The drama/mystery/murder mystery movie type is the first drama/mystery movie type to be processed since it has a greater count. The drama/mystery movie cluster has movie cluster identifier 31 and movie cluster identifier 32. From FIG. 18, movie cluster 31 has three movies and movie cluster 32 has 12 movies. Movie cluster 32 has a greater count and is thus processed first. The MCd of movie cluster 32 is twenty times the cluster identifier ratio or 20*(12/93) which equals 2.58 which rounds to 3. One is added to make it four. The recommended movies list is reviewed for movie cluster 32. Four movies are in movie cluster 32 so these are all returned to the internal movie recommendations list. In this case there are no leftovers for movie cluster 32.

Movie cluster 31 is then processed. Movie cluster 31 includes three recommended movies. The MCd of movie cluster 31 is 20*(3/93) which equals 0.65 which rounds to 1. Thus the first movie for movie cluster 31 is retrieved but not added to the return list since there are not four of them. The one movie from the recommendations list is thus returned as a leftover up to the drama/mystery/murder mystery movie type.

There are no more movie clusters for drama/mystery/murder mystery movie type and the total of one leftover movie is returned. Because there are less than four movies leftover the one movie DEATHTRAP is returned as a leftover up to the Drama/Mystery sub-genre. The next movie type is Drama/Mystery sub-genre of Hitchcock. There are three movies watched under this category. The movie cluster 3 is the first and only movie cluster process. The MCd of movie cluster 3 is 20*(3/93). This rounds to 1. The first recommended movie for movie cluster 3 is REAR WINDOW and is retrieved but has been watched in this example in the last 30 days so the next movie VERTIGO is retrieved but not added to the return list since there are not four. This one movie is returned to the Drama/Mystery/Hitchcock movie type. There are no more movie clusters for Drama/Mystery/Hitchcock type. There is one leftover movie from the Drama/Mystery/Hitchcock movie type. Because there are less than four leftover movies, the one leftover movie VERTIGO was returned up as a leftover to the Drama/Mystery sub-genre. For the sub-genre Drama/Mystery the movies watched are cluster Id 48 at a count of 6, and cluster Id 55 at a count of 18. Movie cluster 55 has more and is thus processed first. The MCd of the movie cluster 55 is 20*(18/93) which equals 3.87 which rounds to 4.

The first four recommendation of movie cluster 55 are added to the return list. There are no leftovers for movie cluster 55. Movie cluster 48 is then processed. Movie cluster 48 has an MCd of 20*(6/93) which equals 1.29 which rounds to 1. The first recommended movie for movie cluster 48, THE THIN MAN, is retrieved but not added to the return list since there are not four of them. This one movie is returned as a leftover up to the Drama/Mystery sub-genre. Because there are no more movie clusters in the Drama/Mystery sub-genre, there are a total of 3 leftover movies for the Drama/Mystery sub-genre. There are less than four of them so three movies are returned up to the Drama genre. For the Drama genre, the movie clusters watched are 34 at a count of 5. Movie cluster 34 is the first and only movie cluster to be processed. The MCd of movie cluster 34 is 20*(5/93). The result is 1.07 which rounds to 1. The first recommended movie for movie cluster 34 is BRAZIL which is retrieved but not added to the return list since there are not four of them. This one movie is returned as a leftover up to the Drama genre. The Drama genre has four leftover movies associated with it. All four movies are added to the return list associated with the Drama genre. DEATH TRAP, VERTIGO, THE THIN MAN and BRAZIL are added to the internal recommendations list.

The next most watched genre was comedy. The comedy sub-genres watched are Screwball Comedy at a count of 17, Comedy Drama at a count of 22 and Comedy/Comedy Drama sub-genre which is the first comedy sub-genre to be processed.

The Comedy/Comedy Drama movie type has Romantic Comedy at a count of 21 and Teen Angst Comedy at a count of 1. The Comedy/Comedy Drama/Romantic Comedy movie type is the first movie cluster to be processed. Movie cluster Id 62 has an MCd of 20*(21/93) which equals 4.52. This rounds to 5. The first four recommended movie cluster Id 62 are, SPEECHLESS, JUST FRIENDS, WHEN HARRY MET SALLY and LEAP YEAR. The fifth recommended movie for movie cluster 62, LIFE AS WE KNOW IT, is retrieved but not added to the return list since there is not a group of 4. This one movie is returned as a leftover up to the Comedy/Comedy Drama/Romantic Comedy movie type.

There are no more movie clusters for the Comedy/Comedy Drama/Romantic Comedy movie type. There is one leftover movies returned to the Comedy/Comedy Drama sub-genre.

The next movie type of the Comedy/Comedy Drama sub-genre is the Comedy/Comedy Drama/Teen Angst Comedy movie type. The Comedy/Comedy Drama/Teen Angst Comedy movie cluster watched has a value of 1. Movie cluster Id 70 is the first and only cluster processed. The movie cluster Id 70 has a count value of 20*(1/93). This rounds to 0 so there are no movies retrieved for cluster Id 70. There are no more movies for the Comedy/Comedy Drama/Teen Angst Comedy movie type. There are no leftover movies for this. There are no more movie clusters for the Comedy/Comedy Drama/Teen Angst Comedy movie type. There are also no leftover movies for this movie type. So, no leftover movies are returned to the movie type up to the Comedy/Comedy Drama sub-genre.

There are no more movie clusters to process for the Comedy/Comedy Drama sub-genre. There is now a total of one leftover movie for the Comedy/Comedy Drama sub-genre. There are less than four of them so that one of the leftover movies is returned up to the comedy genre.

The next Comedy sub-genre is Comedy/Screwball Comedy. There are no movies of this type or genre.

From FIGS. 18 and 19, the movie clusters watched for Comedy/Screwball Comedy sub-genre is 17. The movie cluster 88 is the first and only movie cluster processed for the Comedy/Screwball Comedy sub-genre. The MCd of the movie cluster 88 is 20*(17/93) which is 3.65 which rounds to 4. There is only one recommended movie for movie cluster 88. This is the movie IT'S A MAD, MAD, MAD, MAD WORLD. This movie is retrieved but not added to the return list since there are not four of them. This one movie is returned as a leftover up to the Comedy/Screwball Comedy sub-genre. There are no more movie clusters to process for the Comedy/Screwball Comedy sub-genre. There is now a total of one leftover movie for the Comedy/Screwball Comedy sub-genre. There are less than four of them so the one leftover movie is returned up to the Comedy sub-genre. The Comedy genre has no movie clusters and has two leftover movies associated with it. Two more fill-in movies are to be retrieved to get to four movies. The movie clusters in all of the Comedy genres are in order of most-watched, movie cluster 62, movie cluster 88 and movie cluster 70. All movies from movie cluster 62 have already been retrieved. All movies from movie cluster 88 have also been retrieved. The only two movies from movie cluster 70 are retrieved. The Comedy genre now has four leftover/fill-in movies associated with it. All four movies are added to the return list. These are LIFE AS WE KNOW IT, which was a movie cluster 62 leftover, IT'S A MAD, MAD, MAD, MAD WORLD which was a movie cluster 88 leftover, THE BREAKFAST CLUB which was a cluster 70 fill-in and PRETTY IN PINK which is also a cluster 70 fill-in.

The last genre to process is Kids. There are no sub-genres. There is one movie cluster watched which has a count value of 7. The MCd of the movie cluster 88 is 20*(7/93) which equals 1.51 which in turn rounds to 2. The first of 2 recommended movies for movie cluster 12 is THE SPONGEBOB SQUAREPANTS MOVIE and BLACK BEAUTY. These are retrieved but not added to the return list since there are not four of them. These are returned as a leftover up to the Kids genre. There is now a total of 2 leftover movies for the Comedy/Screwball Comedy sub-genre. There are less than 4 of them so that one leftover movie is returned up to the Comedy genre.

There are no more movie clusters to process for the Kids genre. The Kids genre has two leftover movies associated with it. Two more fill-in movies are to be retrieved to get four movies. There is only one movie cluster in the entire Kids genre. That is, movie cluster 12. The first two recommended movies for movie cluster 12 have already been retrieved so the next two recommended movies from that cluster are retrieved.

The Kids genre now has four combined leftover/fill-in movies associated with it. All four movies are added to the return list associated with the Kids genre since there are four of them.

Table 2010 has the entire return list for the above example. There are four movies under the Drama/Mystery/Murder Mystery sub-category. These movies are: WHERE THE BOUGH BREAKS, BLOOD TEST, ECHO PARK, and THE NARROWS. The Drama category has DEATH TRAP, VERTIGO, THE THIN MAN and BRAZIL. The Comedy/Comedy Drama/Romantic Comedy category has SPEECHLESS, JUST FRIENDS, WHEN HARRY MET SALLY, and LEAP YEAR. The Comedy genre has LIFE AS WE KNOW IT, IT'S A MAD, MAD, MAD, MAD WORLD, THE BREAKFAST CLUB, and PRETTY IN PINK. The Kids category has THE SPONGEBOB SQUARE PANTS movie, BLACK BEAUTY, ERNEST GOES TO CAMP and FINDING NEMO.

Figure 21:
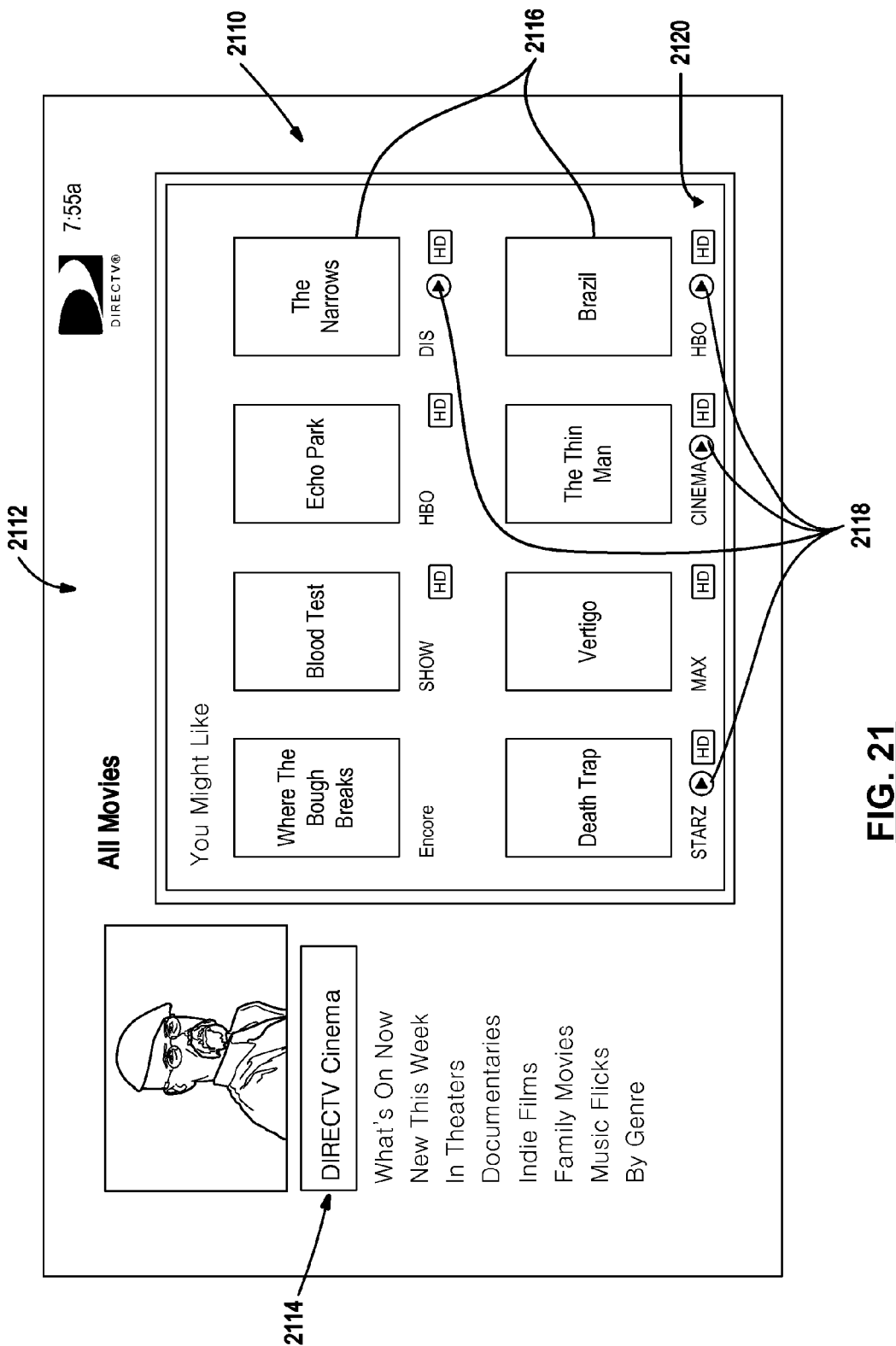
FIG. 21 is a screen display of a user interface for interacting with recommended movies.
Figure 22:
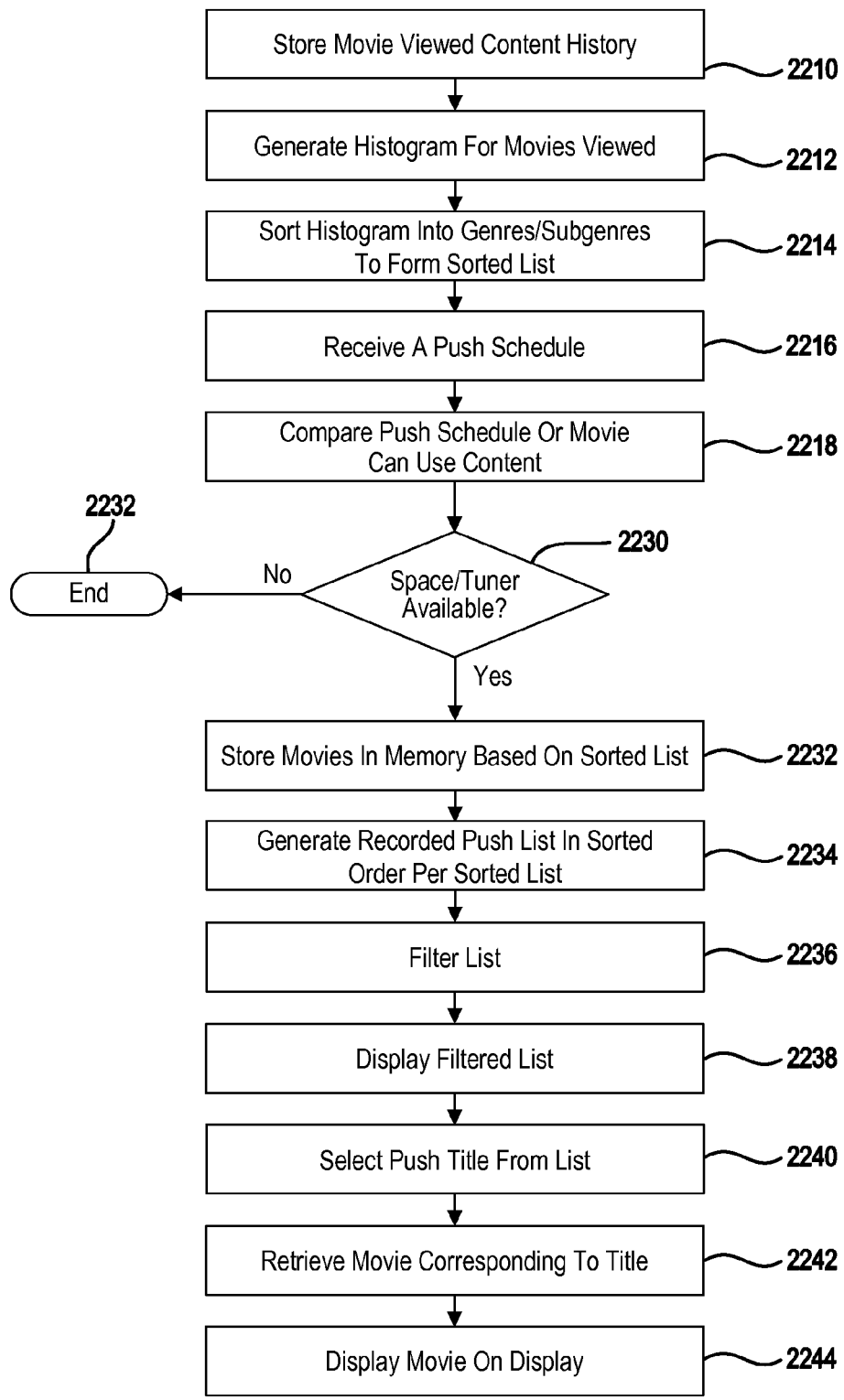
FIG. 22 is a flow chart of a method for recording push or carouseled content.

Referring now to FIG. 21, an example of an internal recommendations list 2110 is illustrated partially within a screen display 2112 of a user device. In the present example, "DIRECTV Cinema" at menu item 2114 is used to trigger the recommended movie screen display which, in this example, contains 8 posters 2116. The selection of menu item 2114 may trigger the formation of the internal recommendations list. A recorded movie indicator 2118 may also be provided below. The movies that have been prerecorded on a push or user initiated basis in the memory of the user device. In this example, the wording "You Might Like" is placed above the 8 movie posters 2116. By selecting the arrow 2120 more movies may be displayed. In the example of FIG. 21, the first 8 movies of the list illustrated in FIG. 20 are provided. All or a portion of the list of movies in the internal recommendations list of FIG. 20 may be displayed at any one time. The arrow 2120 is used to scroll to other movies or content to be displayed. Each poster may have the channel thereunder as well. As described earlier, each row of posters has been organized according to similar genre, sub-genre or movie type. Optionally this information may be displayed above each row, for example "Murder Mysteries" may be displayed above the first row of movie posters, which were selected from the clusters comprising the Drama/Mystery/Murder Mystery sub-category, while "Other Dramas" may be displayed above the second row of movie posters, which were selected from a variety of clusters within the Drama category, Referring now to FIG. 22, a method for recording and displaying push available movies to all receiving devices based upon a personalized movie recommendation at each device is set forth. In this example, the dominant genre/sub-genre movie preference is based on the individual device movie viewing history as described above. If there is limited memory space, the device may only record the push movies that match the dominant genre/sub-genres. If there is a sufficient amount of memory for all the push movies then the device may record or store the push movies matching the dominant genre/sub-genre first instead of blindly recording and displaying all push movies.

Push movies are movies that may be communicated using a carousel or other push mechanism. In the present example, the carousel may be present at the satellite. Push content is content that is pushed to a user without being specifically requested. In the present example, push movies are made available but not all push movies may be recorded within the user device. The push movies may be stored based upon user preferences of genre and sub-genre. Not being recorded when sufficient space is not present within the memory of the user device.

In step 2210 the viewed content history of the user device is stored in a memory within the user device. In step 2212 a histogram for the most viewed movies may be obtained or generated. This process was described in detail above. In step 2214 the histogram is sorted into genres and sub-genres to form a sorted list.

In step 2216 a push schedule having content identifiers and genre and sub-genre identifiers may be communicated to the user device. Step 2216 receives the push schedule at the user device. In step 2218 the push schedule or the movie carousel content is compared to the histogram of genres and sub-genres.

In step 2230 it is determined whether space is available in the memory of the user device to record push titles or whether a tuner is available to receive the content. The amount of push titles may be adjusted based upon the space. If space or a tuner is not available step 2232 ends the process.

In Step 2230 if space is available, step 2232 stores movies (or other content) in the user device based on the comparison of step 2218.

In step 2234 a recorded list of pushed content is generated when requested by the user through an interface such as a user interface. The user may select a menu item that allows the user device to display the sorted list of already pushed titles recorded within the user device. In step 2236 the push list is filtered. The push list may be filtered by parental ratings, content type or the like. In step 2238 the filtered list is displayed on the screen display associated with the user device. The filtered list may be displayed using posters in a similar manner to that set forth in FIG. 21.

In step 2240 a push title may be selected from the list. This may be performed using one of the user interfaces associated with the user device. In step 2242 the movie corresponding to the title is retrieved from the memory of the user device. In step 2244 the movie is displayed on a display associated with a user device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A method comprising:
   generating a viewed content history for content corresponding to viewed content at a user device;
   comparing the viewed content history and push content;
   storing at least one push content at the user device in response to comparing to form a recorded push content list; and
   displaying the recorded push content list corresponding to the push content stored in the user device on a display associated with the user device.

2. The method as recited in claim 1 wherein generating the viewed content history comprises generating the viewed content history relative to a genre of content viewed at the user device.

3. The method as recited in claim 1 wherein generating the viewed content history comprises generating the viewed content history relative to a genre and a sub-genre of content viewed at the user device.

4. The method as recited in claim 1 further comprising determining tuner availability and wherein storing at least one push content comprises storing at least one push content based on tuner availability.

5. The method as recited in claim 1 further comprising determining memory space availability and wherein storing at least one push content comprises storing at least one push content based on memory space availability.

6. The method as recited in claim 1 wherein generating the viewed content history comprises generating the viewed content history in a genre histogram having a count of viewed content for a genre.

7. The method as recited in claim 1 wherein generating the viewed content history comprises generating the viewed content history in a sub-genre histogram having a count of viewed content for a sub-genre.

8. The method as recited in claim 1 wherein generating the viewed content history comprises generating the viewed content history for a predetermined period prior to a present time.

9. The method as recited in claim 1 further comprising receiving a push schedule having a plurality of push content and genre identifiers associated therewith.

10. The method as recited in claim 9 wherein comparing comprises comparing a genre of the viewed content history and the genre identifiers.

11. The method as recited in claim 9 wherein receiving the push schedule comprises receiving the push schedule for content pushed from a satellite.

12. The method as recited in claim 1 further comprising prior to displaying the recorded push content list, setting a content rating limit and filtering the push content list in response to the content rating limit.

13. The method as recited in claim 1 wherein storing at least one push content comprises storing the at least one push content in a user partition of the user device.

14. The method as recited in claim 1 wherein storing at least one push content comprises storing the at least one push content in a network partition of the user device.

15. A user device comprising:
   a viewer tracking module generating a viewed content history for content corresponding to viewed content at the user device;
   a recommendation recording module comparing the viewed content history and push content and storing at least one push content at the user device in response comparing to form a recorded content push list; and
   a display displaying the recorded content push list corresponding to the content stored in the user device.

16. The user device as recited in claim 15 wherein the viewed content history comprises the viewed content history relative to a genre of the viewed content at the user device.

17. The user device as recited in claim 15 wherein the viewed content history comprises the viewed content history relative to a genre and sub-genre of the viewed content at the user device.

18. The user device as recited in claim 15 further comprising determining tuner availability and wherein storing at least one content based on tuner availability.

19. The user device as recited in claim 15 wherein the recommendation recording module stores at least one push content based on memory space availability.

20. The user device as recited in claim 15 wherein the viewed content history comprises a histogram relative to a genre of the viewed content at the user device.

21. The user device as recited in claim 15 wherein the viewed content history comprises a histogram relative to a genre and sub-genre of the viewed content at the user device.

22. The user device as recited in claim 15 wherein the viewed content history comprises the viewed content history for a predetermined period prior to a present time.

23. The user device as recited in claim 15 wherein the recommendation recording module receives a push schedule having a plurality of push content and genre identifiers associated therewith.

24. The user device as recited in claim 23 wherein the recommendation recording module compares a genre of the viewed content history and the genre identifiers.

25. The user device as recited in claim 23 wherein the user device receives the push schedule from a satellite.

26. The user device as recited in claim 15 further comprising a filter having a content rating limit filtering the push content in response to the content rating limit.

27. The user device as recited in claim 15 wherein the memory comprises a user partition, and wherein the recommendation recording module stores at least one push content in the user partition.

28. The user device as recited in claim 15 wherein the memory comprises a network partition, and wherein the recommendation recording module stores at least one push content in the network partition.

* * * * *